United States Patent
Amano et al.

(10) Patent No.: US 9,557,538 B2
(45) Date of Patent: Jan. 31, 2017

(54) PROJECTION ZOOM LENS AND PROJECTION TYPE DISPLAY DEVICE

(71) Applicant: FUJIFILM Corporation, Tokyo (JP)

(72) Inventors: Masaru Amano, Saitama-ken (JP); Yukiko Nagatoshi, Saitama-ken (JP); Masanao Kawana, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 86 days.

(21) Appl. No.: 14/711,095

(22) Filed: May 13, 2015

(65) Prior Publication Data

US 2015/0241669 A1 Aug. 27, 2015

Related U.S. Application Data

(63) Continuation of application No. PCT/JP2013/006614, filed on Nov. 11, 2013.

(30) Foreign Application Priority Data

Nov. 19, 2012 (JP) ................. 2012-253316

(51) Int. Cl.
*G02B 15/14* (2006.01)
*G02B 9/64* (2006.01)
(Continued)

(52) U.S. Cl.
CPC ............ *G02B 13/16* (2013.01); *G02B 15/177* (2013.01); *G02B 15/20* (2013.01);
(Continued)

(58) Field of Classification Search
CPC . G02B 13/0045; G02B 27/0025; G02B 13/18; G02B 9/60; G02B 9/62; G02B 15/177; G02B 13/04; G02B 15/20; G02B 13/009; G02B 5/005; G02B 13/002; G02B 9/64
(Continued)

(56) References Cited

U.S. PATENT DOCUMENTS 7,426,080 B2 9/2008 Sugita
7,586,690 B2 9/2009 Yamada
(Continued)

FOREIGN PATENT DOCUMENTS

JP 2005-106948 4/2005
JP 2006-184723 7/2006
(Continued)

OTHER PUBLICATIONS

International Search Report dated Feb. 18, 2014 in corresponding International Application No. PCT/JP2013/006614.

*Primary Examiner* — Evelyn A Lester
(74) *Attorney, Agent, or Firm* — Young & Thompson

(57) ABSTRACT

A projection zoom lens constituted by: a negative first lens group; a positive final lens group; and moving lens groups between the first and the final lens groups that move independently while changing magnification, satisfies the conditional formulae below:

$$1.00 < (Rf2-Rr2)/(Rf2+Rr2) \qquad (1)$$

$$0.00 \leq (Rr2-Rf3)/(Rr2+Rf3) < 0.15 \qquad (2)$$

$$2.5 < Bf/Im\phi \qquad (9)$$

wherein Rf2 and Rr2 respectively are the radii of curvature of the front and rear surfaces of the second lens from the magnification side within the most reduction side moving lens group, Rf3 is the radius of curvature of the front surface of the third lens from the magnification side within the most reduction side moving lens group, Bf is the back focus of the entire system at the reduction side at the wide angle end as an air converted length, and Imφ is the maximum effective image circle diameter at the reduction side.

18 Claims, 24 Drawing Sheets

(51) Int. Cl.
    *G02B 13/16*     (2006.01)
    *G02B 15/177*     (2006.01)
    *G02B 15/20*     (2006.01)
    *G02B 27/00*     (2006.01)
    G02B 9/60     (2006.01)
    G02B 13/00     (2006.01)
    G02B 9/62     (2006.01)
    G02B 5/00     (2006.01)
    G02B 13/04     (2006.01)
    G02B 13/18     (2006.01)
    G02B 27/64     (2006.01)

(52) U.S. Cl.
    CPC .......... *G02B 27/0025* (2013.01); *G02B 5/005* (2013.01); *G02B 9/60* (2013.01); *G02B 9/62* (2013.01); *G02B 9/64* (2013.01); *G02B 13/002* (2013.01); *G02B 13/009* (2013.01); *G02B 13/0045* (2013.01); *G02B 13/04* (2013.01); *G02B 13/18* (2013.01); *G02B 27/646* (2013.01)

(58) Field of Classification Search
    USPC ................. 359/649, 650, 676, 680, 683–686,359/713–715, 740, 761, 762, 770, 781–783
    See application file for complete search history.

(56) References Cited

U.S. PATENT DOCUMENTS

| | | | |
|---|---|---|---|
| 8,179,606 B2 | 5/2012 | Amano | |
| 8,213,091 B2 | 7/2012 | Sado | |
| 8,228,613 B2 | 7/2012 | Sado | |
| 8,976,455 B2 * | 3/2015 | Nagahara | G02B 15/177 359/649 |
| 2007/0195427 A1 | 8/2007 | Sugita | |
| 2008/0231962 A1 | 9/2008 | Yamada | |
| 2008/0247049 A1 | 10/2008 | Inoko | |
| 2009/0257129 A1 * | 10/2009 | Kawana | G02B 15/177 359/649 |
| 2010/0245786 A1 | 9/2010 | Sado | |
| 2010/0271601 A1 * | 10/2010 | Amano | G02B 15/177 353/97 |
| 2011/0026132 A1 | 2/2011 | Sado | |
| 2011/0109975 A1 | 5/2011 | Amano | |
| 2011/0304921 A1 * | 12/2011 | Nagahara | G02B 15/177 359/680 |
| 2013/0314800 A1 * | 11/2013 | Amano | G02B 13/16 359/683 |
| 2014/0078595 A1 * | 3/2014 | Amano | G02B 13/16 359/682 |
| 2014/0111868 A1 * | 4/2014 | Nagatoshi | G02B 15/14 359/680 |
| 2015/0226947 A1 * | 8/2015 | Kawana | G02B 15/177 359/680 |
| 2015/0241670 A1 * | 8/2015 | Amano | G02B 15/177 359/680 |

FOREIGN PATENT DOCUMENTS

| | | |
|---|---|---|
| JP | 2007-225877 | 9/2007 |
| JP | 2008-46259 | 2/2008 |
| JP | 2008-257005 | 10/2008 |
| JP | 2009-251316 | 10/2009 |
| JP | 2010-237605 | 10/2010 |
| JP | 2010-282159 | 12/2010 |
| JP | 2011-33657 | 2/2011 |
| JP | 2011-100079 | 5/2011 |

* cited by examiner

FIG.1
EXAMPLE 1
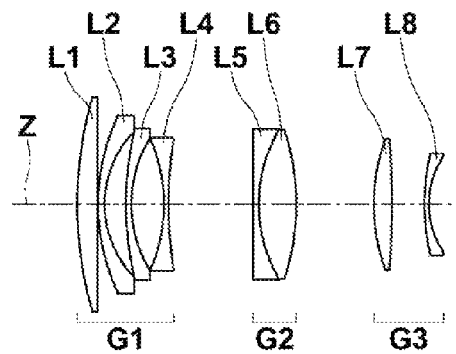
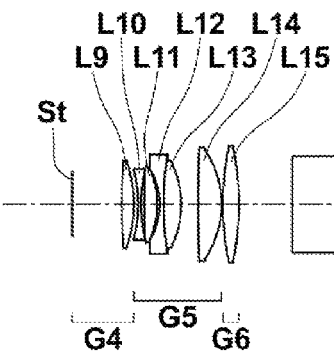
WIDE ANGLE END
INTERMEDIATE POSITION
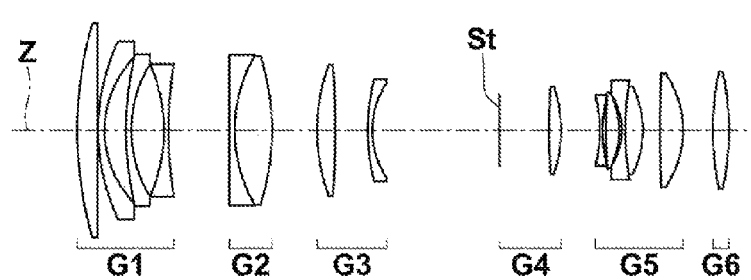
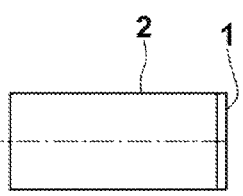
TELEPHOTO END
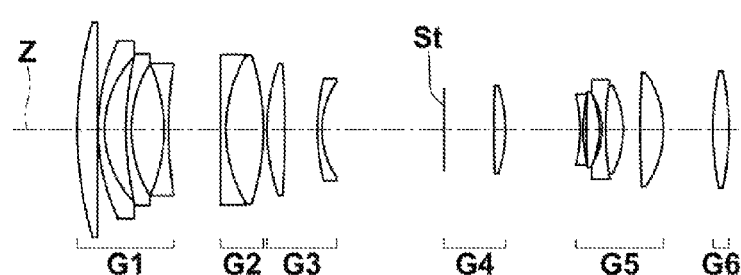
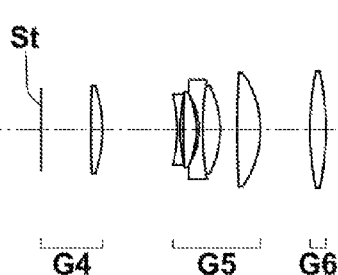
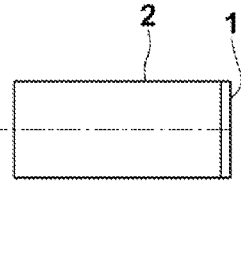

FIG.2
EXAMPLE 2
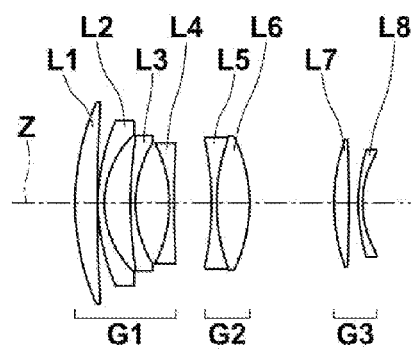
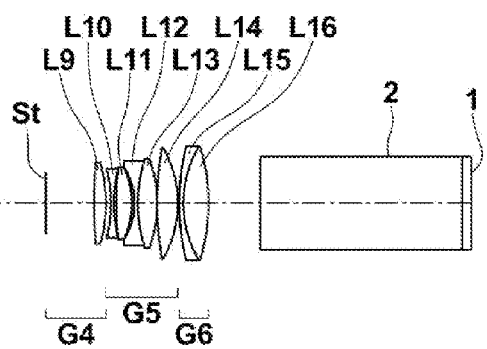
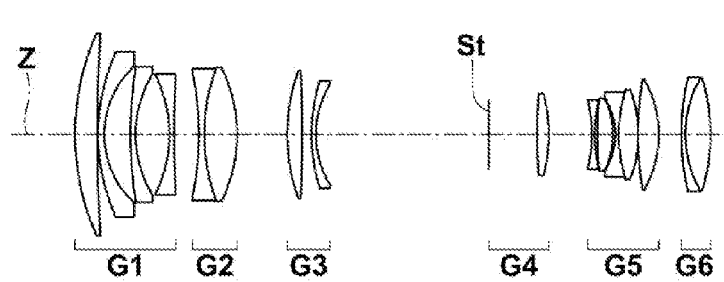
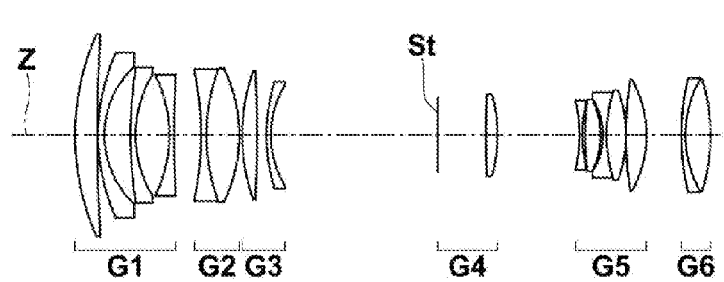

FIG.10
EXAMPLE 10
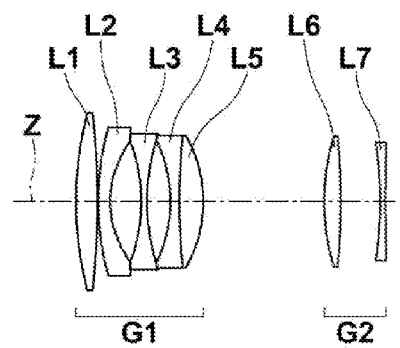
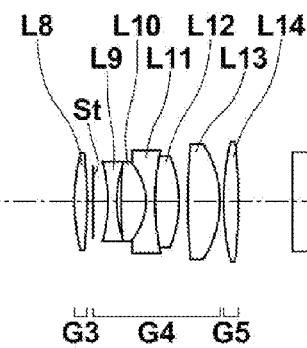
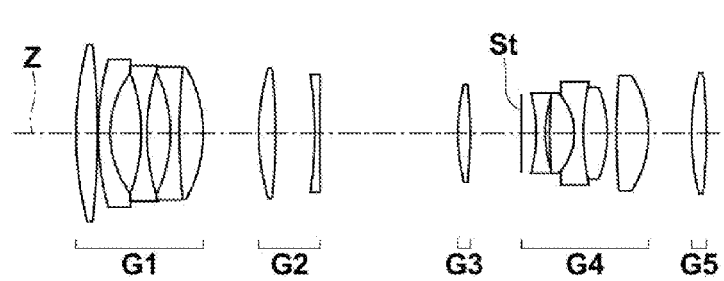
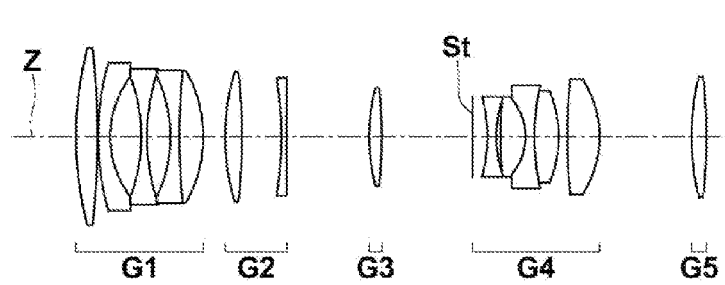

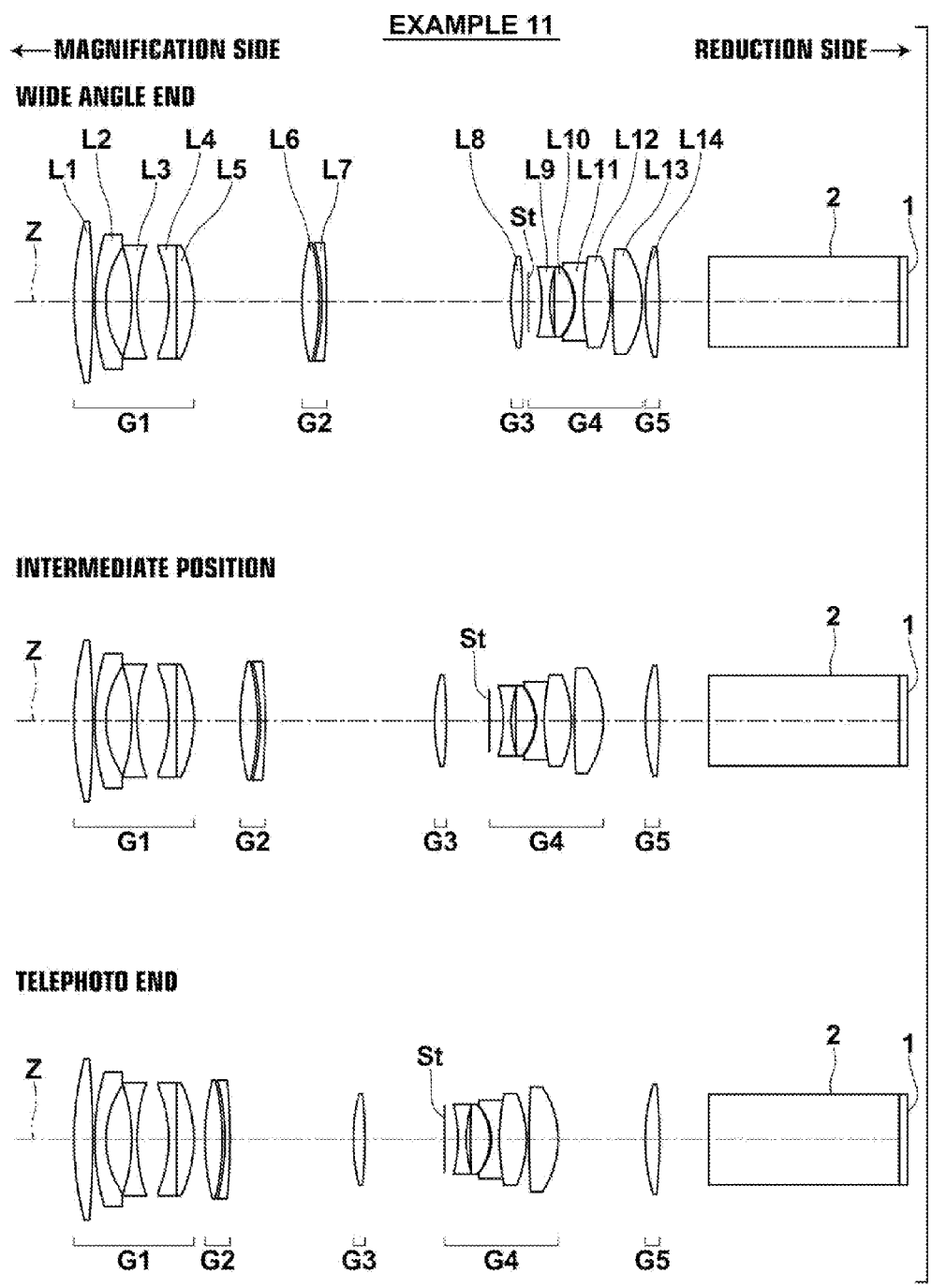

FIG.12

EXAMPLE 1

WIDE ANGLE END

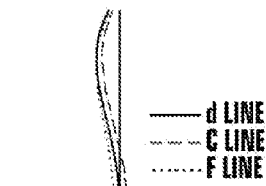
FNo. = 2.50
-0.1 0 0.1
SPHERICAL ABERRATION
A
— d LINE
--- C LINE
······ F LINE

ω = 31.4°
-0.1 0 0.1
ASTIGMATISM
B
— SAGITTAL
······ TANGENTIAL
d LINE

ω = 31.4°
-5% 0 5%
DISTORTION
C
d LINE

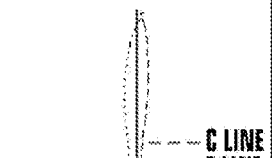
ω = 31.4°
-0.01 0 0.01
LATERAL CHROMATIC ABERRATION
D
--- C LINE
······ F LINE

INTERMEDIATE POSITION

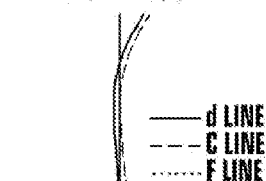
FNo. = 2.50
-0.1 0 0.1
SPHERICAL ABERRATION
E
— d LINE
--- C LINE
······ F LINE

ω = 27.1°
-0.1 0 0.1
ASTIGMATISM
F
d LINE
— SAGITTAL
······ TANGENTIAL

ω = 27.1°
-5% 0 5%
DISTORTION
G
d LINE

ω = 27.1°
-0.01 0 0.01
LATERAL CHROMATIC ABERRATION
H
--- C LINE
······ F LINE

TELEPHOTO END

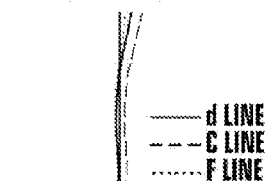
FNo. = 2.50
-0.1 0 0.1
SPHERICAL ABERRATION
I
— d LINE
--- C LINE
······ F LINE

ω = 23.1°
-0.1 0 0.1
ASTIGMATISM
J
d LINE
— SAGITTAL
······ TANGENTIAL

ω = 23.1°
-5% 0 5%
DISTORTION
K
d LINE

ω = 23.1°
-0.01 0 0.01
LATERAL CHROMATIC ABERRATION
L
--- C LINE
······ F LINE

FIG.13
EXAMPLE 2
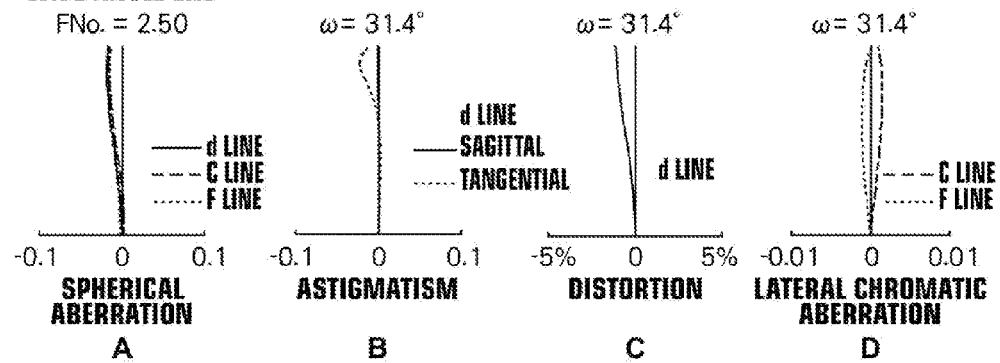
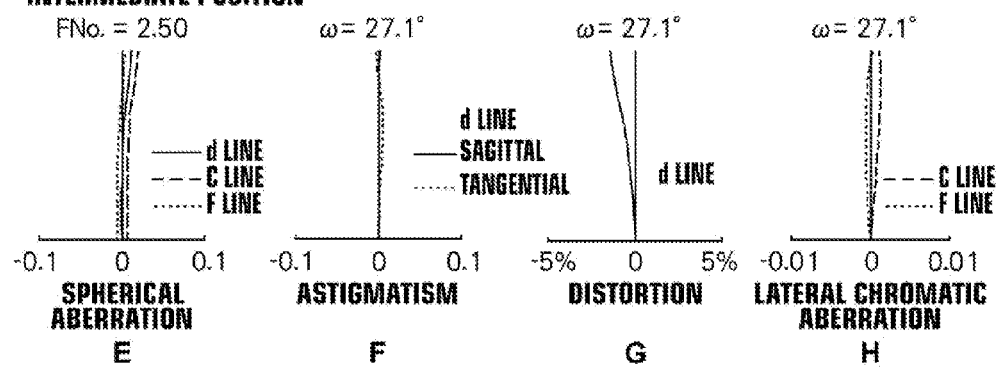
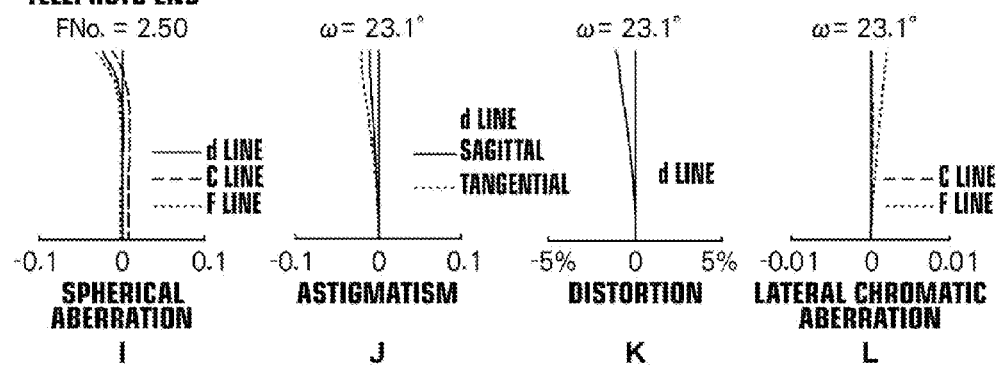

FIG.14
EXAMPLE 3
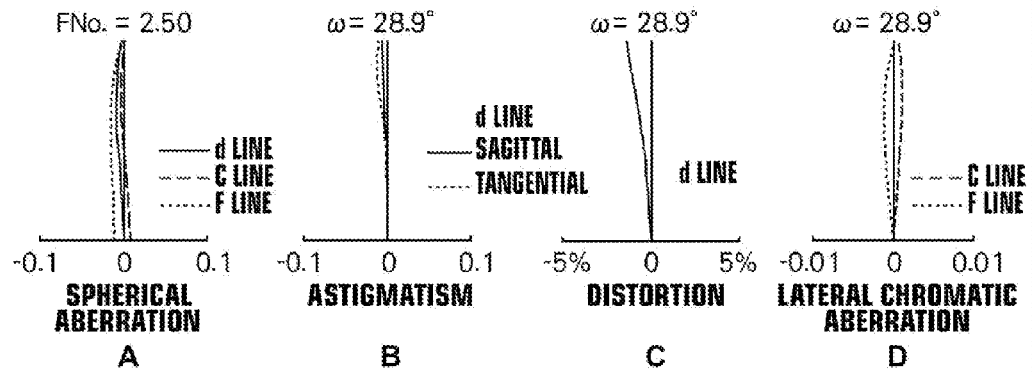
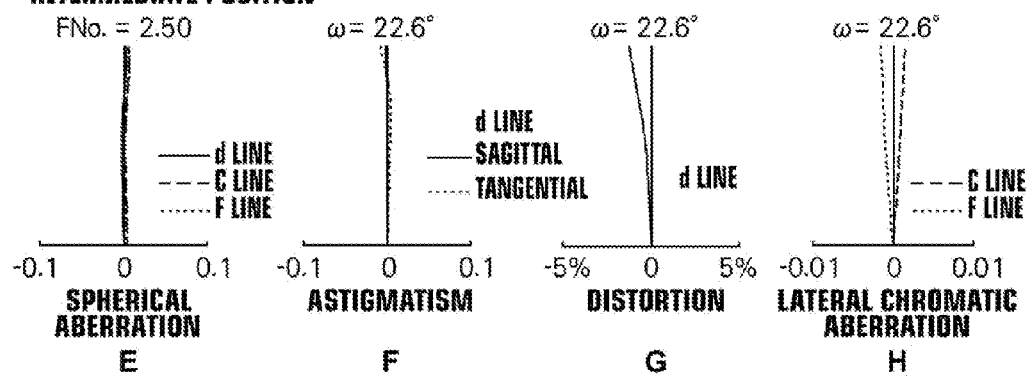
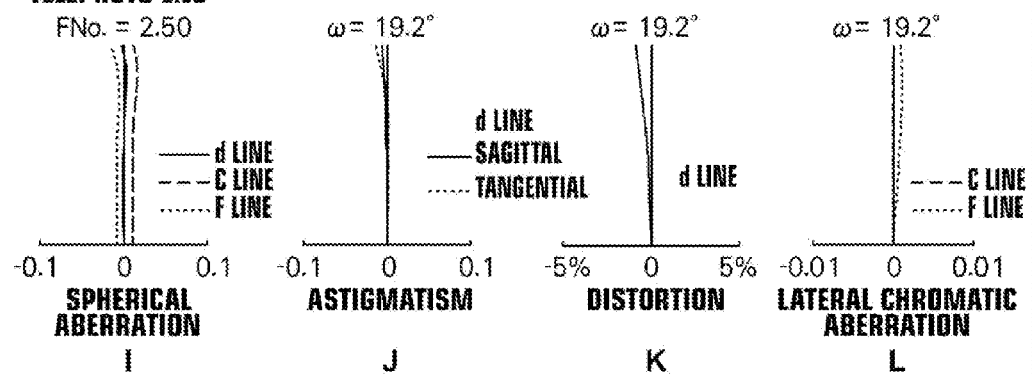

FIG.15
EXAMPLE 4
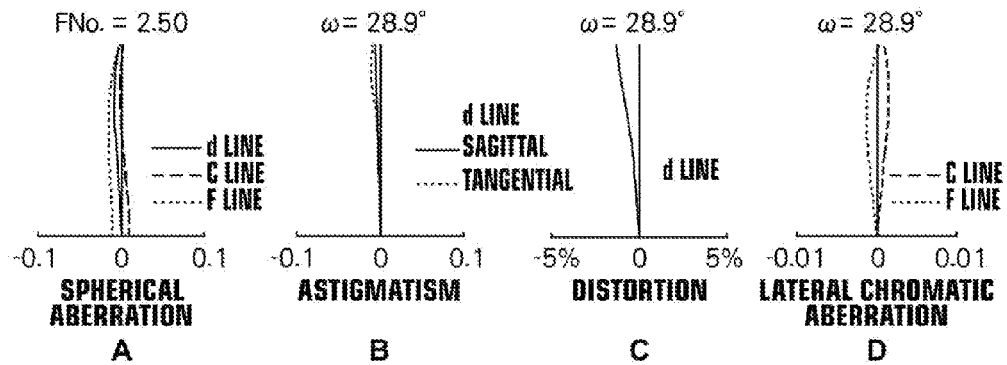
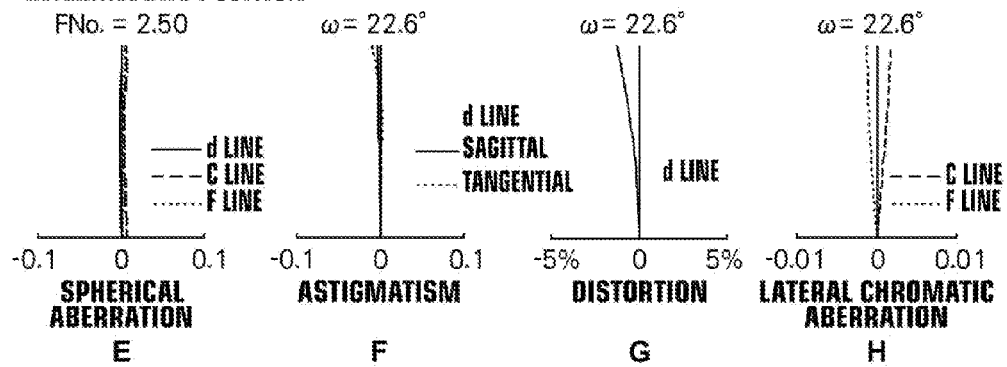
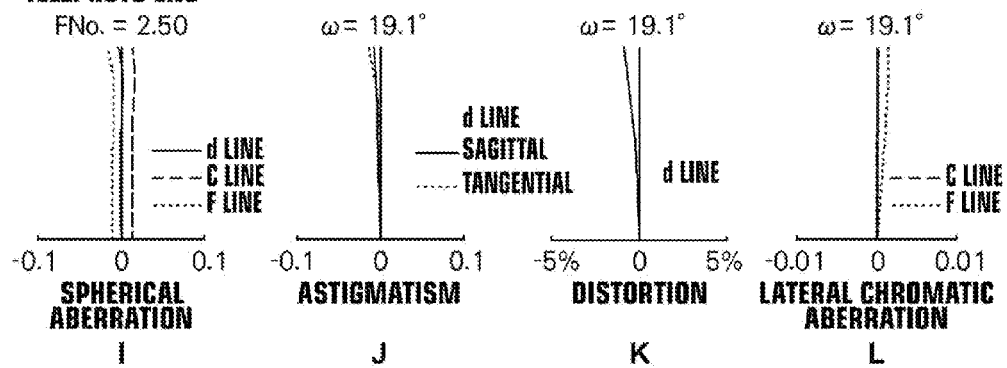

FIG.16
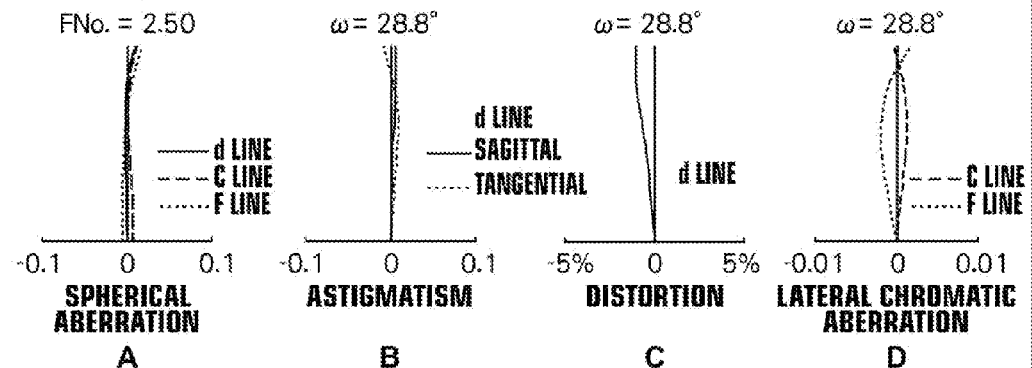
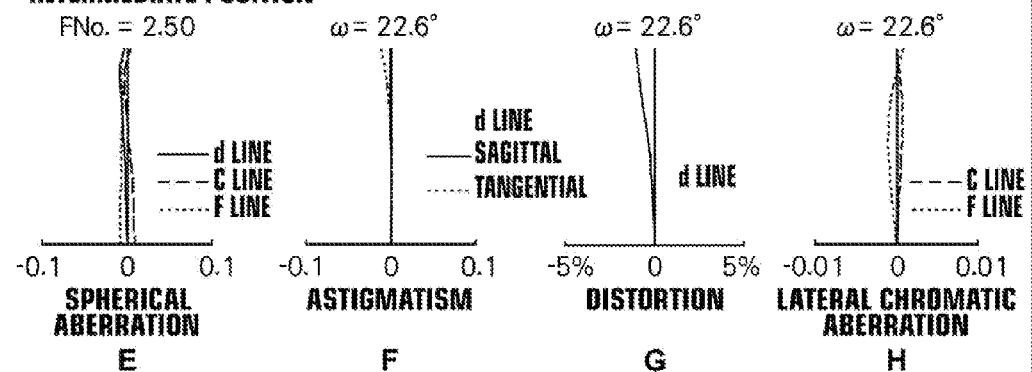
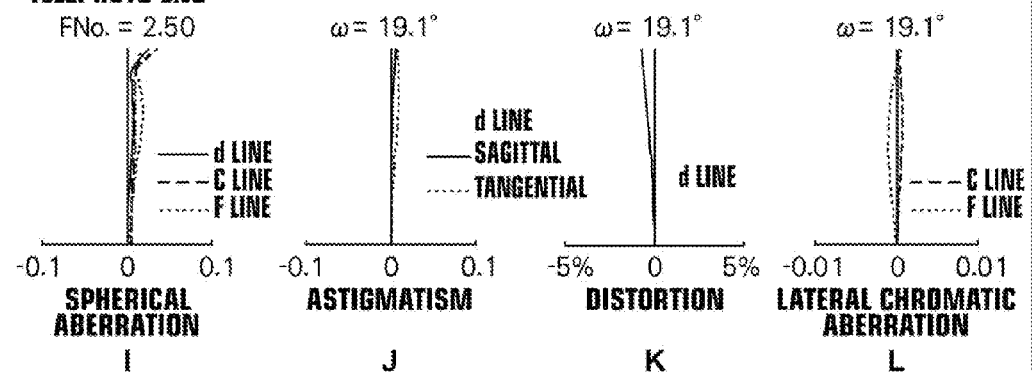

FIG.17
EXAMPLE 6
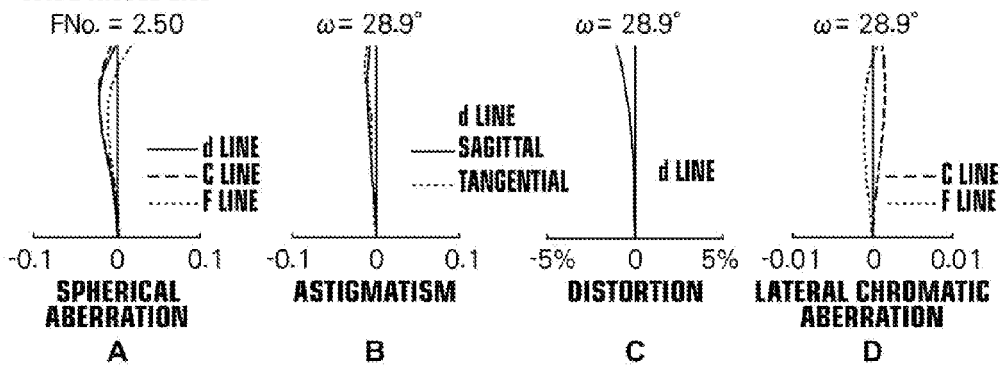
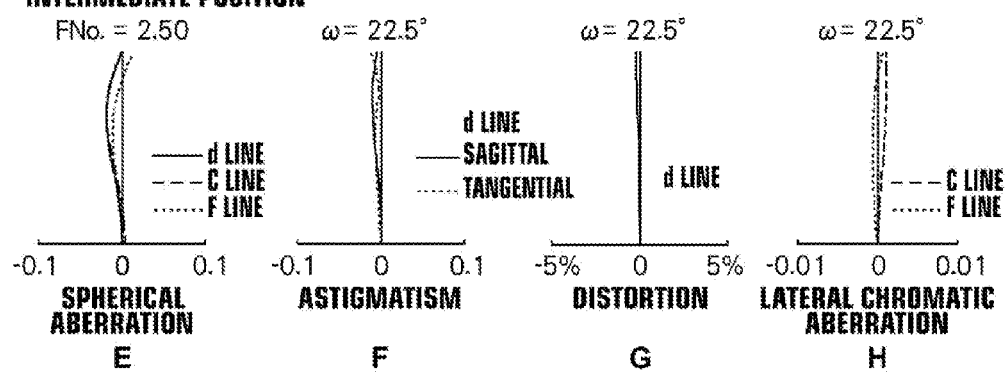
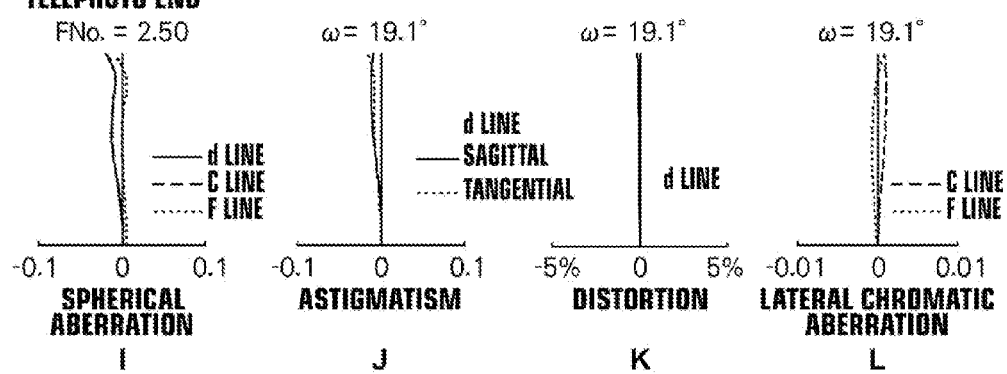

FIG.18
EXAMPLE 7
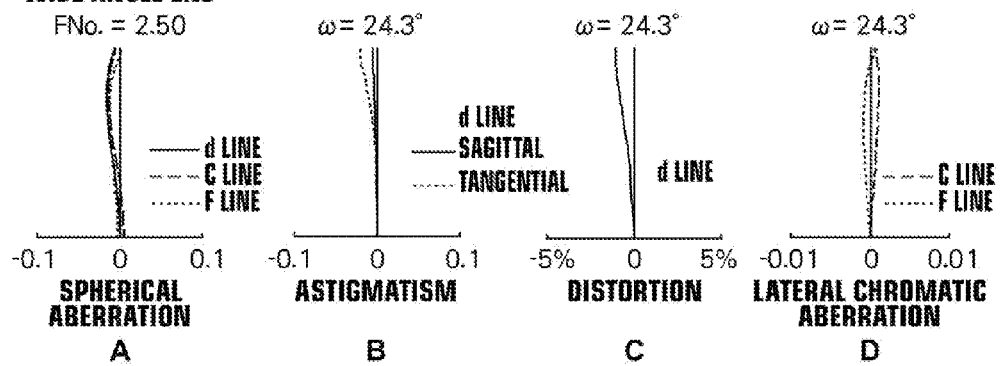
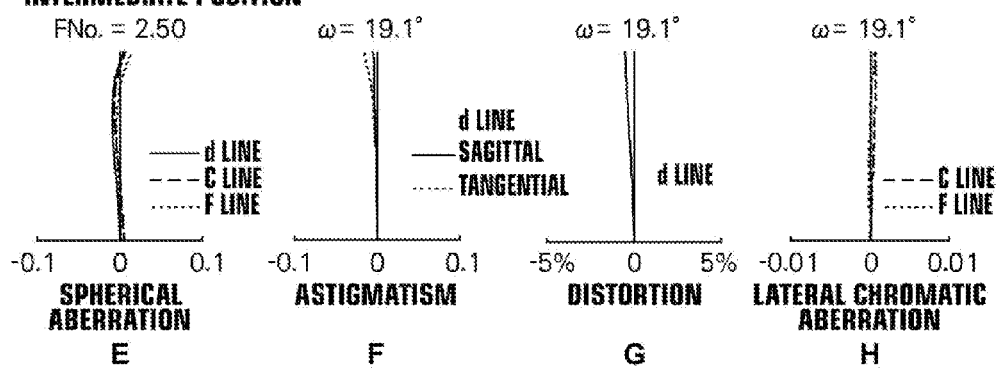
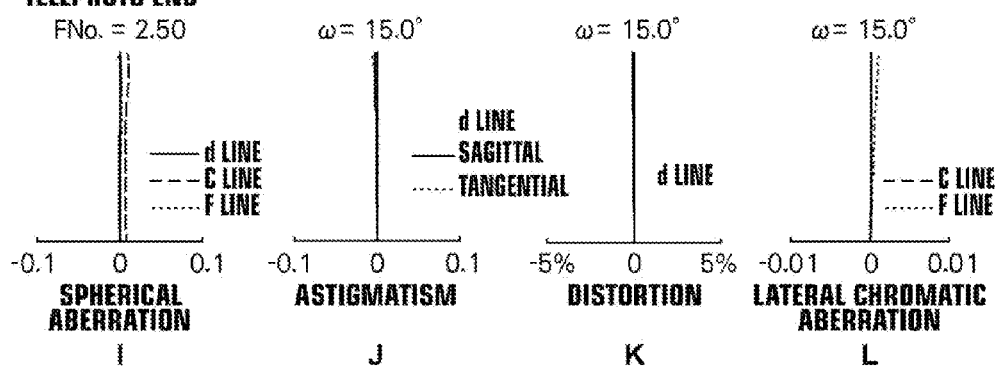

FIG.19
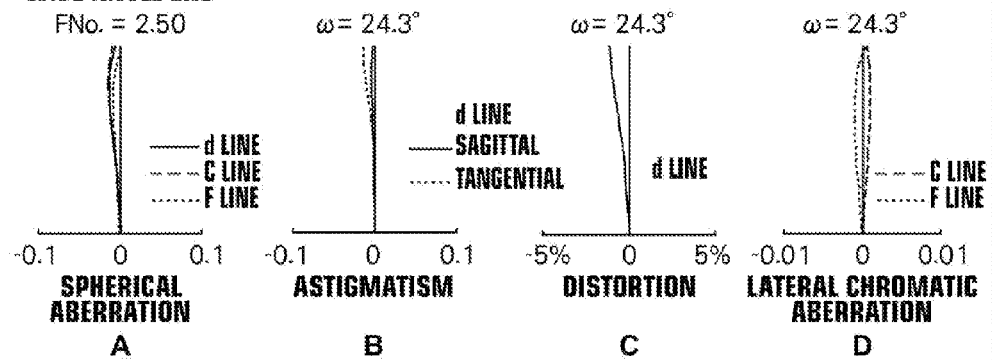
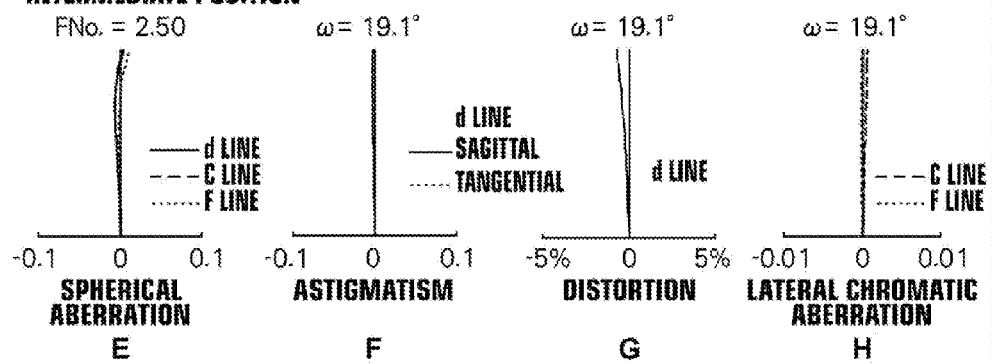
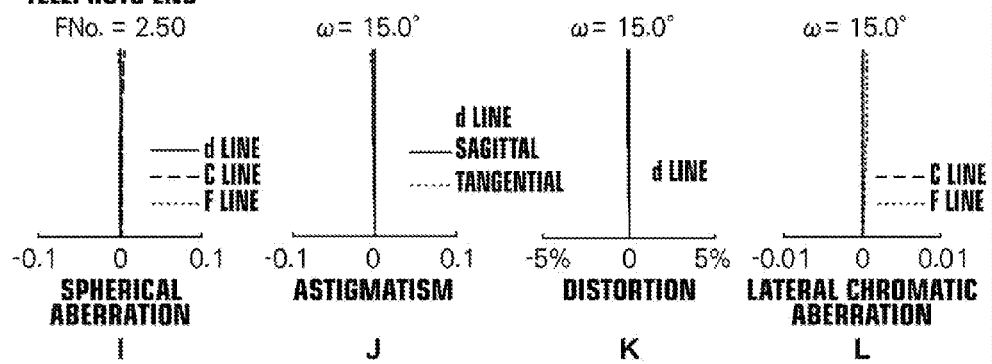

FIG.20
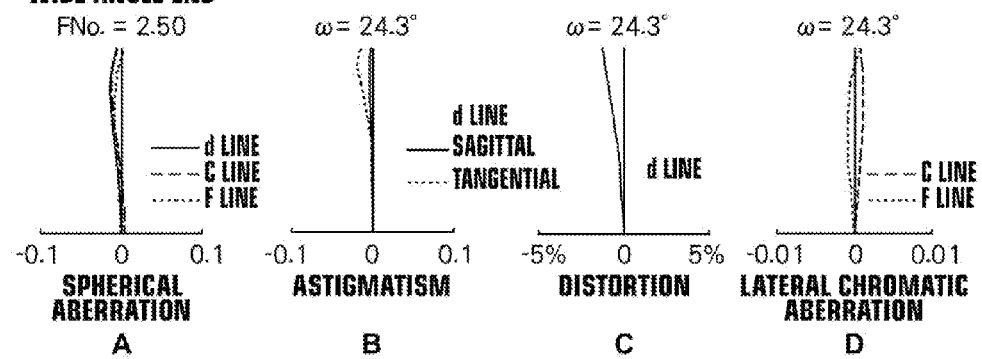
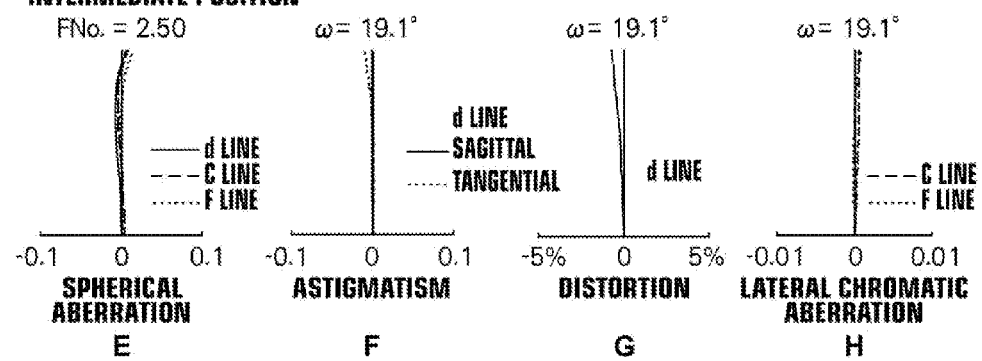
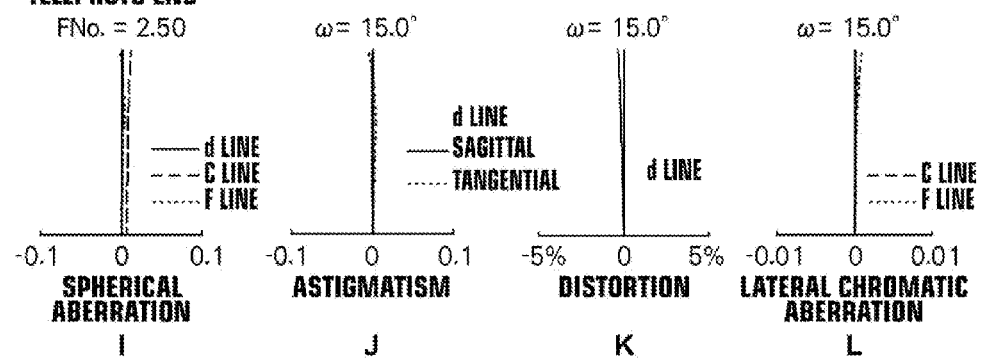

FIG.21
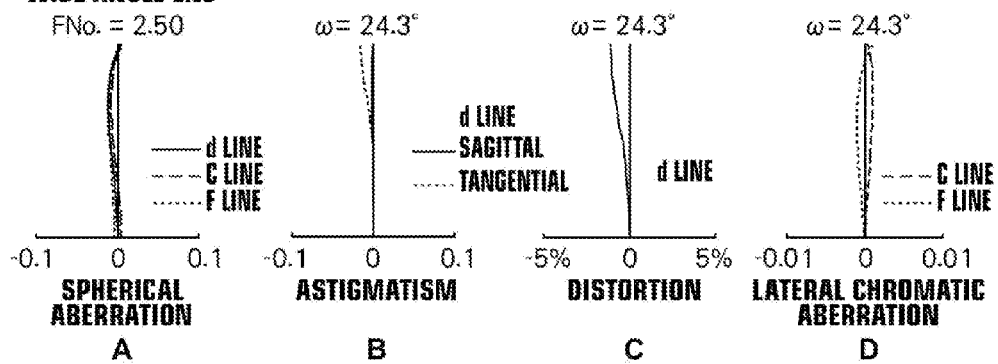
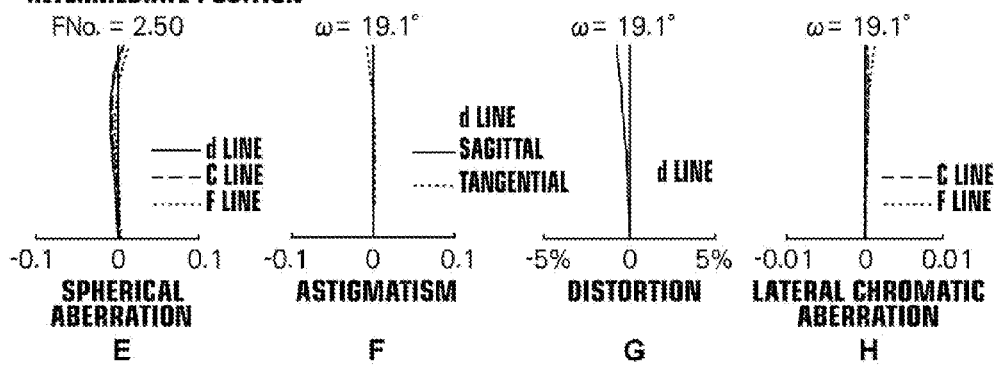
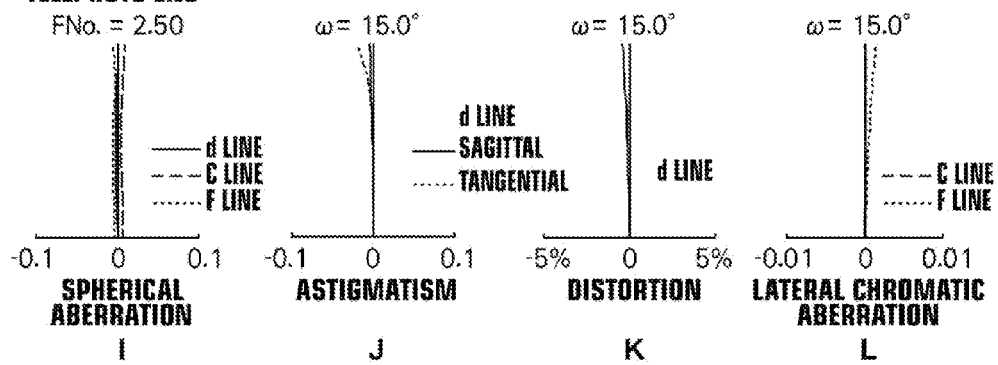

FIG.22
EXAMPLE 11
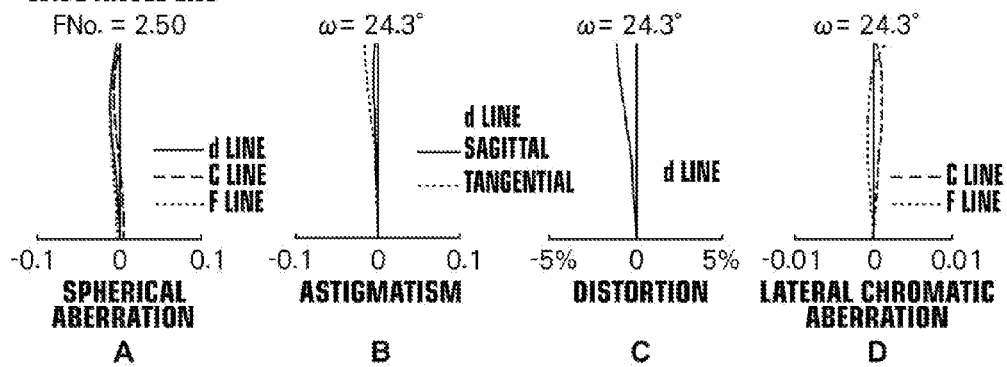
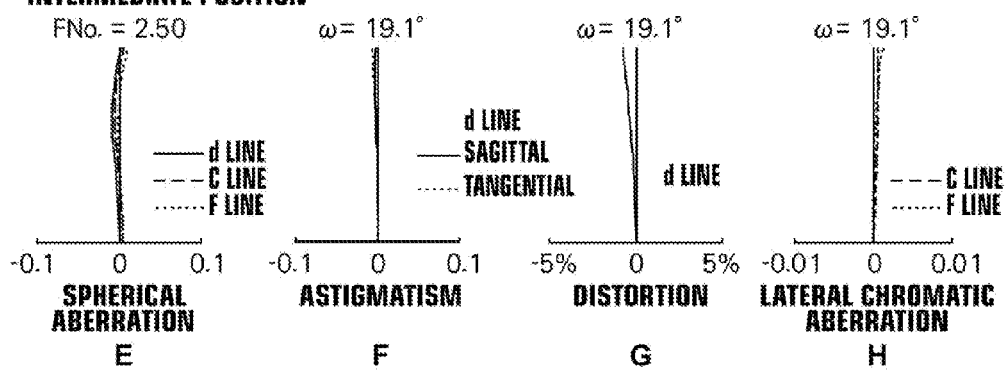
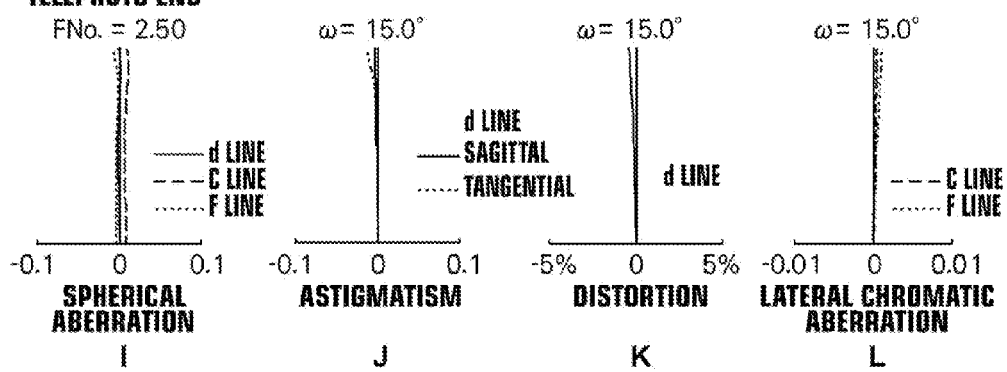

PROJECTION ZOOM LENS AND PROJECTION TYPE DISPLAY DEVICE

CROSS REFERENCE TO RELATED APPLICATIONS

The present application is a Continuation of PCT International Application No. PCT/JP2013/006614 filed on Nov. 11, 2013, which claims priority under 35 U.S.C. §119(a) to Japanese Patent Application No. 2012-253316 filed on Nov. 19, 2012. Each of the above applications is hereby expressly incorporated by reference in its entirety, into the present application.

BACKGROUND OF THE INVENTION

Technical Field

The present invention is related to a projection zoom lens, and particularly to a projection zoom lens for use in a projection type display device.

In addition, the present invention is related to a projection type display device equipped with a projection zoom lens.

Background Art

Conventionally, projection type display devices that utilize light valves, such as liquid crystal display elements, DMD's (Digital Micromirror Devices: registered trademark), etc., are in wide use. In addition, projection type display devices which are capable of displaying higher resolution images applicable to large screens are also being utilized recently, in cinema theaters and the like.

The three plate method, in which three light valves are provided, each for a primary color, a light beam from a light source is separated into three primary colors with a color separating optical system, combined by a color combining optical system after passing through each of the light valves, and then projected, is adopted in the aforementioned projection type display devices which are utilized in cinema theaters and the like. Therefore, there is demand for a long back focus and favorably telecentric properties in such projection type display devices.

In addition, zoom lenses having high zoom ratios are desired as projection lenses in projection type display devices which are provided for use in cinema theaters and the like, so as to be compatible with projection distances and screen sizes which differ in each theater and each hall, and further the aspect ratio (cinema scope size, vista size, etc.) of displayed images, in order to match the sizes of displayed images with screen sizes.

There is also often demand for the numerical aperture (hereinafter, also referred to as "F number") of these types of zoom lenses to be maintained constant throughout the entire zoom range, in order to prevent the brightness of displayed images from changing when magnification is changed in these projection zoom lenses in order to match the sizes of displayed images with screen sizes.

Further, projection type display devices are becoming compact and available at low cost, accompanying the digitization of cinema screens. There is a tendency for miniaturization and cost reduction to be desired in projection zoom lenses, in addition to the aforementioned demand for back focus, telecentric properties, and high zoom ratios.

Japanese Unexamined Patent Publication Nos. 2006-184723, 2005-106948, and 2008-046259 disclose zoom lenses which are presumed to be applied to projection type display devices More specifically, Japanese Unexamined Patent Publication No. 2006-184723 discloses a projection zoom lens having a six group configuration that includes a first lens group having a negative refractive power provided at the most magnification side and a final lens group having a positive refractive power provided at the most reduction side, which are fixed when changing magnification. An aperture stop is provided in a fourth lens group in this zoom lens. Meanwhile, Japanese Unexamined Patent Publication No. 2005-106948 discloses a projection zoom lens that maintains a constant numerical aperture, by configuring lens groups toward the reduction side of an aperture stop to not move while changing magnification. In addition, Japanese Unexamined Patent Publication No. 2008-046259 discloses a projection zoom lens that includes a first lens group having a negative refractive power provided at the most magnification side and a final lens group having a positive refractive power provided at the most reduction side, which are fixed when changing magnification. The numerical aperture of this projection zoom lens is maintained constant throughout the entire zoom range, by a variable stop, of which the aperture diameter varies accompanying changes in magnification, being employed.

DISCLOSURE OF THE INVENTION

As described above, there is demand for zoom lenses having high zoom ratios in projection type display devices which are utilized in cinema theaters and the like. However, fluctuations in distortion and field curvature caused by changes in magnification are likely to occur if conventional projection zoom lenses are configured to have a high zoom ratio.

The present invention has been developed in view of the foregoing circumstances. It is an object of the present invention to provide a projection zoom lens that can maintain high performance even if configured to have a high zoom ratio. It is another object of the present invention to provide a projection type display device equipped with such a projection zoom lens.

A projection zoom lens of the present invention consists essentially of:

a first lens group, which is provided most toward the magnification side, has a negative refractive power, and is fixed while changing magnification;

a final lens group, which is provided most toward the reduction side, has a positive refractive power, and is fixed while changing magnification; and an intermediate group provided between the first lens group and the final lens group, constituted by a plurality of moving lens groups that move independently of each other along the optical axis while changing magnification;

the moving lens group provided most toward the reduction side within the intermediate group comprising a lens having a negative refractive power, a lens having a positive refractive power, a lens having a negative refractive power, and a lens having a positive refractive power, provided in this order from the magnification side; and the projection zoom lens satisfying Conditional Formulae (1) and (2) below:

$$1.00 < (Rf2 - Rr2)/(Rf2 + Rr2) \tag{1}$$

$$0.00 \le (Rr2 - Rf3)/(Rr2 + Rf3) < 0.15 \tag{2}$$

wherein Rf2 is the radius of curvature of the front surface of the second lens from the magnification side within the lens group most toward the reduction side from among the lens groups that move while changing magnification, Rr2 is the radius of curvature of the rear surface of the second lens from the magnification side within the lens group most toward the reduction side from among the lens groups that move while changing magnification, and Rf3 is the radius of curvature of the front surface of the third lens from the magnification side within the lens group most toward the reduction side from among the lens groups that move while changing magnification.

Here, the expression "consists essentially of" also refers to cases in which the projection zoom lens includes lenses that substantially do not have any power, optical elements other than lenses such as a stop and a cover glass, and mechanical components such as lens flanges, a lens barrel, an imaging element, and a camera shake correcting mechanism.

Note that it is desirable for projection zoom lens of the present invention to satisfy Conditional Formulae (3) and (4) below:

$$0 < Nd1 - Nd2 \tag{3}$$

$$Nd2 < 1.60 \tag{4}$$

wherein Nd1 is the refractive index with respect to the d line of the first lens from the magnification side within the lens group most toward the reduction side from among the lens groups that move while changing magnification, and Nd2 is the refractive index with respect to the d line of the second lens from the magnification side within the lens group most toward the reduction side from among the lens groups that move while changing magnification.

Here, with respect to the condition defined in Conditional Formula (4), it is more desirable for Conditional Formula (4') below to be satisfied.

$$Nd2 < 1.55 \tag{4'}$$

In addition, it is desirable for the lens group provided most toward the reduction side within the intermediate group to consist essentially of a lens having a negative refractive power, a lens having a positive refractive power, a lens having a negative refractive power, a lens having a positive refractive power, and a lens having a positive refractive power, provided in this order from the magnification side.

In addition, it is desirable for only spherical lenses to be employed as lenses in the projection zoom lens of the present invention.

In addition, it is desirable for the projection lens of the present invention to satisfy Conditional Formula (5) below:

$$1.4 < Zr \tag{5}$$

wherein Zr is the zoom ratio of the telephoto end with respect to the wide angle end.

In addition, it is desirable for the projection zoom lens of the present invention to satisfy Conditional Formula (6) below:

$$-2.0 < f1/fw < -0.8 \tag{6}$$

wherein f1 is the focal length of the first lens group, and fw is the focal length of the entire system at the wide angle end.

Here, with respect to the condition defined in Conditional Formula (6), it is more desirable for Conditional Formula (6') below to be satisfied.

$$-1.8 < f1/fw < -1.0 \tag{6'}$$

In the projection zoom lens of the present invention, it is desirable for Conditional Formula (7) below to be satisfied:

$$2.0 < fe/fw < 7.0 \tag{7}$$

wherein fe is the focal length of the final lens group, and fw is the focal length of the entire system at the wide angle end.

Here, with respect to the condition defined by Conditional Formula (7), it is more desirable for Conditional Formula (7') below to be satisfied.

$$3.0 < fe/fw < 6.0 \tag{7'}$$

Further, in the projection zoom lens of the present invention, it is desirable for the intermediate group to comprise at least a second lens group having a positive refractive power that moves while changing magnification and a third lens group having a positive refractive power that moves while changing magnification, provided in this order from the magnification side, and for the projection zoom lens to satisfy Conditional Formula (8) below.

$$3.0 < f3/fw < 8.0 \tag{8}$$

wherein f3 is the focal length of the third lens group, and fw is the focal length of the entire system at the wide angle end.

In addition, in the projection zoom lens of the present invention, it is desirable for an aperture stop to be provided between adjacent moving lens groups of the intermediate group or provided within one of the moving lens groups of the intermediate group; the aperture stop to be set such that the numerical aperture of the zoom lens becomes constant through the entire zoom range; and the projection zoom lens to be configured such that the reduction side is telecentric.

It is desirable for the aperture stop to be a variable stop that changes the aperture diameter thereof while changing magnification such that the numerical aperture of the zoom lens becomes constant through the entire zoom range.

Alternatively, the aperture stop may be a movable stop that moves independently while changing magnification such that the numerical aperture of the zoom lens becomes constant through the entire zoom range.

Note that the expression "provided within one of the moving lens groups" refers not only to cases in which the aperture stop is provided between the lens most toward the magnification side of the moving lens group and the lens most toward the reduction side of the moving lens group, but also refers to cases in which the aperture stop is provided more toward the magnification side than the lens most toward the magnification side and cases in which the aperture stop is provided more toward the reduction side than the lens most toward the reduction side.

In addition, the expression "the reduction side is telecentric" means that an angular line that bisects the cross section of a light beam focused at an arbitrary point on an image surface at the reduction side between the maximum ray of light at the upper side and the maximum ray of light at the lower side thereof is close to being parallel with the optical axis. The expression "the reduction side is telecentric" is not limited to cases in which the reduction side is completely telecentric, that is, cases in which the bisecting angular line is completely parallel to the optical axis, but also refers to cases in which a certain degree of error is present. Here, the certain degree of error refers to a range of inclination between the bisecting angular line and the optical path of ±3°

In addition, it is preferable for the projection zoom lens of the present invention to satisfy Conditional Formulae (9) and (10) below:

$$2.5 < Bf/Im\phi \tag{9}$$

$$L/Im\phi < 12 \tag{10}$$

wherein Bf is the back focus (an air converted length) of the entire system at the reduction side at the wide angle end, Imφ is the maximum effective image circle diameter (image circle diameter) at the reduction side, and L is the distance along the optical axis from the lens surface most toward the magnification side to the lens surface most toward the reduction side when the projection distance is infinity.

Here, with respect to the condition defined by Conditional Formula (9), it is more desirable for Conditional Formula (9') to be satisfied.

$$2.8 < Nf/\text{Im}\phi \tag{9'}$$

In addition, with respect to the condition defined by Conditional Formula (10), it is more desirable for Conditional Formula (10') to be satisfied.

$$7 < L/\text{Im}\phi < 11 \tag{10'}$$

Meanwhile, a projection type display device of the present invention comprises:

a light source;

a light valve, into which light from the light source enters; and a projection zoom lens that projects optical images formed by light modulated by the light valve onto a screen, and is characterized by:

the projection zoom lens of the present invention described above being applied as the projection zoom lens.

The projection zoom lens of the present invention is configured to satisfy Conditional Formulae (1) and (2). Therefore, high performance can be maintained even if the projection zoom lens is configured to have a high zoom ratio. Particularly, it will become possible to suppress fluctuations in spherical aberration, distortion, and field curvature caused by changes in magnification.

The above advantageous effects will be exhibited more prominently in the case that the projection zoom lens of the present invention satisfies Conditional Formulae (3) and (4). Particularly, it will become possible to favorably correct fluctuations in field curvature. The above advantageous effect will become even more prominent in the case that the conditional formula below is satisfied within the range defined by Conditional Formula (4).

$$Nd2 < 1.55 \tag{4'}$$

In addition, a high zoom ratio can be secured and the utilizable range of the projection zoom lens can be broadened, if the projection zoom lens of the present invention satisfies aforementioned Conditional Formula (5).

$$1.4 < Zr \tag{5}$$

The above advantageous effects will become more prominent in the case that the conditional formula below is satisfied within the range defined by Conditional Formula (5).

$$1.6 < Zr \tag{5'}$$

In addition, the following advantageous effects can be obtained in the case that the projection zoom lens of the present invention satisfies aforementioned Conditional Formula (6).

$$-2.0 < f1/fw < -0.8 \tag{6}$$

That is, if the value of f1/fw is less than or equal to −2.0, the outer diameters of the lenses toward the magnification side will increase, which will lead to the zoom lens becoming large, and it will also become difficult to secure a sufficient amount of back focus. However, such problems can be avoided if the value of f1/fw is greater than −2.0. That is, the outer diameters of the lenses toward the magnification side can be decreased to enable the zoom lens to be formed compact, and a sufficient amount of back focus can be secured if the value of f1/fw is greater than −2.0.

In addition, if the value of f1/fw is greater than or equal to −0.8, correction of field curvature and distortion will become difficult. However, this problem can be avoided if the value of f1/fw is less than −0.8. That is, field curvature and distortion can be favorably corrected if the value of f1/fw is less than −0.8.

The above advantageous effect will become more prominent in the case that the conditional formula below is satisfied within the range defined by Conditional Formula (6).

$$-1.8 < f1/fw < -1.0 \tag{6'}$$

In addition, the following advantageous effects can be obtained by the projection zoom lens of the present invention particularly in the case that aforementioned Conditional Formula (7) is satisfied.

$$2.0 < fe/fw < 7.0 \tag{7}$$

That is, if the value of fe/fw is less than or equal to 2.0, correction of spherical aberration will become difficult. In addition, the outer diameters of the lenses toward the magnification side will increase, which will lead to the zoom lens becoming large. However, such problems can be avoided if the value of fe/fw is greater than 2.0. That is, spherical aberration can be favorably corrected, while the outer diameters of the lenses toward the magnification side can be decreased to enable the zoom lens to be formed compact if the value of fe/fw is greater than 2.0.

In addition, if the value of fe/fw is greater than or equal to 7.0, the amount of spherical aberration tends to increase at the telephoto end. However, this problem can be avoided if the value of fe/fw is less than 7.0. That is, the amount of spherical aberration at the telephoto end can be suppressed if the value of fe/fw is less than 7.0.

The above advantageous effect will become more prominent in the case that the conditional formula below is satisfied within the range defined by Conditional Formula (7).

$$3.0 < fe/fw < 6.0 \tag{7'}$$

In addition, the following advantageous effects can be obtained if the projection zoom lens of the present invention satisfies the conditional formula below.

$$3.0 < f3/fw < 8.0 \tag{8}$$

That is, if the value of f3/fw is less than or equal to 3.0, correction of field curvature and lateral chromatic aberration will become difficult. However, this problem can be avoided if the value of f3/fw is greater than 3.0. That is, field curvature and lateral chromatic aberration can be favorably corrected if the value of f3/fw is greater than 3.0.

In addition, if the value of f3/fw is greater than or equal to 8.0, the total length of the projection zoom lens will become long. However, this problem can be avoided if the value of f3/fw is less than 8.0. That is, the total length of the projection zoom lens can be suppressed if the value of f3/fw is less than 8.0.

In addition, a sufficiently long back focus can be achieved in the case that the projection zoom lens of the present invention satisfies aforementioned Conditional Formula (9).

$$2.5 < Bf/\text{Im}\phi \tag{9}$$

That is, if the value of Bf/Imϕ is less than or equal to the lower limit value of 2.5, it will become difficult to secure a sufficient amount of back focus. As a result, it will become difficult to insert a prism.

The above advantageous effect will become more prominent in the case that the conditional formula below is satisfied within the range defined by Conditional Formula (9).

$$2.8 < Bf/Im\phi \quad (9')$$

Further, the total length of the projection zoon lens can be shortened in the case that the projection zoom lens of the present invention satisfies aforementioned Conditional Formula (10) below.

$$L/Im\phi < 12 \quad (10)$$

The above advantageous effect will become more prominent in the case that the conditional formula below is satisfied within the range defined by Conditional Formula (10).

$$7 < L/Im\phi < 11 \quad (10')$$

In the case that the value of L/Imϕ is less than or equal to 7, correction of chromatic aberration will become difficult. However, this problem can be avoided and chromatic aberration can be favorably corrected in the case that Conditional Formula (10') is satisfied.

Note that it is generally desired for zoom lenses which are applied to projection type display devices for use in cinema theaters and the like to have an F number less than 3.0 (bright) through the entire zoom range. The projection zoom lens of the present invention is capable of meeting this demand. Specific numerical values of the F number will be described in detail in connection with the Examples to be described later.

In addition, it is generally desired for zoom lenses which are applied to the aforementioned projection type display devices to suppress distortion to within approximately 2% through the entire zoom range. The projection zoom lens of the present invention is capable of meeting this demand. Specific numerical values of the distortion will be described in detail in connection with the Examples to be described later.

Meanwhile, the projection type display device of the present invention utilizes the zoom lens of the present invention described above as a projection zoom lens. Therefore, a high zoom ratio can be secured, and fluctuations in distortion and field curvature caused by changes in magnification can be suppressed.

BRIEF DESCRIPTION OF THE DRAWINGS

FIG. 1 is a collection of sectional diagrams that illustrate the lens configuration of a projection zoom lens according to Example 1 of the present invention.

FIG. 2 is a collection of sectional diagrams that illustrate the lens configuration of a projection zoom lens according to Example 2 of the present invention.

FIG. 10 is a collection of sectional diagrams that illustrate the lens configuration of a projection zoom lens according to Example 10 of the present invention.

FIG. 11 is a collection of sectional diagrams that illustrate the lens configuration of a projection zoom lens according to Example 11 of the present invention.

A through L of FIG. 12 are diagrams that illustrate aberrations of the projection zoom lens according to Example 1.

A through L of FIG. 13 are diagrams that illustrate aberrations of the projection zoom lens according to Example 2.

A through L of FIG. 14 are diagrams that illustrate aberrations of the projection zoom lens according to Example 3.

A through L of FIG. 15 are diagrams that illustrate aberrations of the projection zoom lens according to Example 4.

A through L of FIG. 16 are diagrams that illustrate aberrations of the projection zoom lens according to Example 5.

A through L of FIG. 17 are diagrams that illustrate aberrations of the projection zoom lens according to Example 6.

A through L of FIG. 18 are diagrams that illustrate aberrations of the projection zoom lens according to Example 7.

A through L of FIG. 19 are diagrams that illustrate aberrations of the projection zoom lens according to Example 8.

A through L of FIG. 20 are diagrams that illustrate aberrations of the projection zoom lens according to Example 9.

A through L of FIG. 21 are diagrams that illustrate aberrations of the projection zoom lens according to Example 10.

A through L of FIG. 22 are diagrams that illustrate aberrations of the projection zoom lens according to Example 11.

Figure 23:
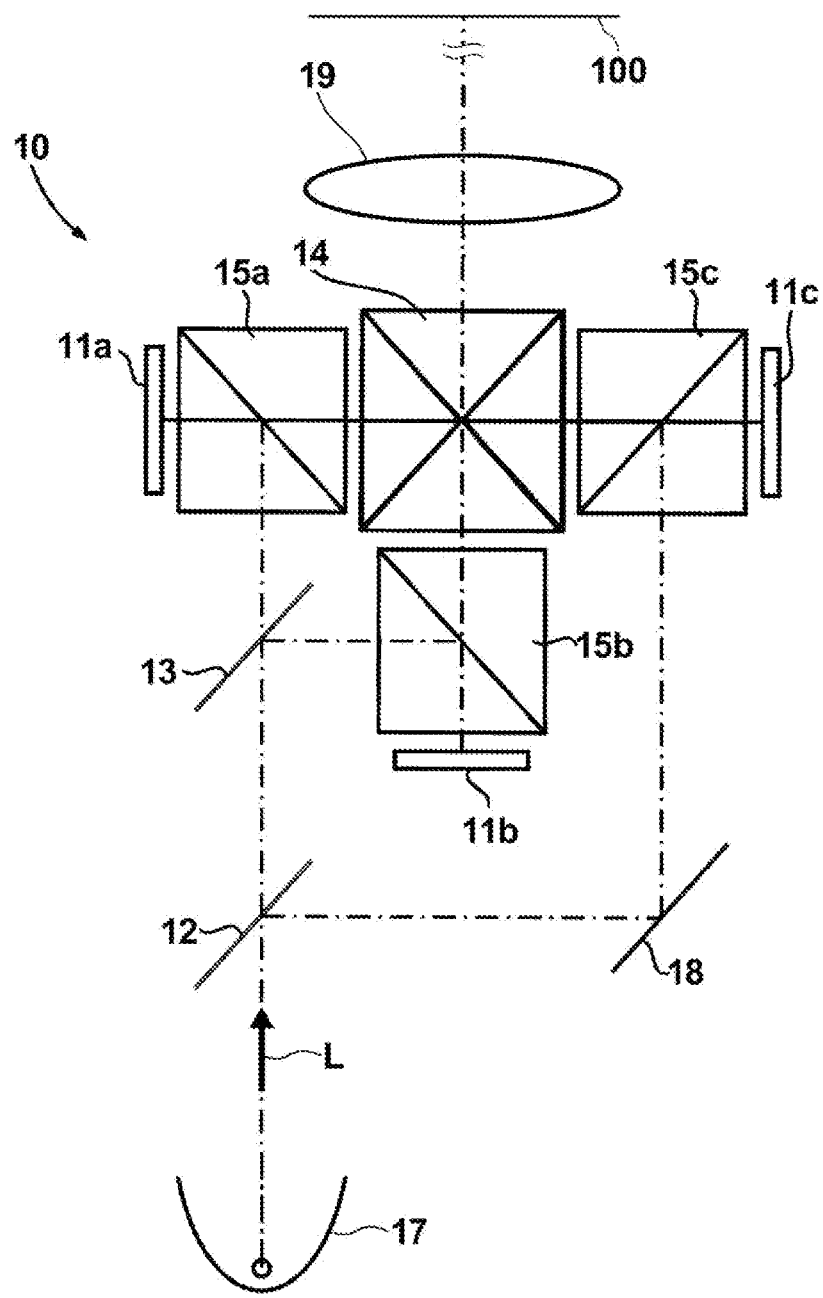

FIG. 23 is a diagram that illustrates the schematic configuration of a projection type display device according to an embodiment of the present invention.

Figure 24:
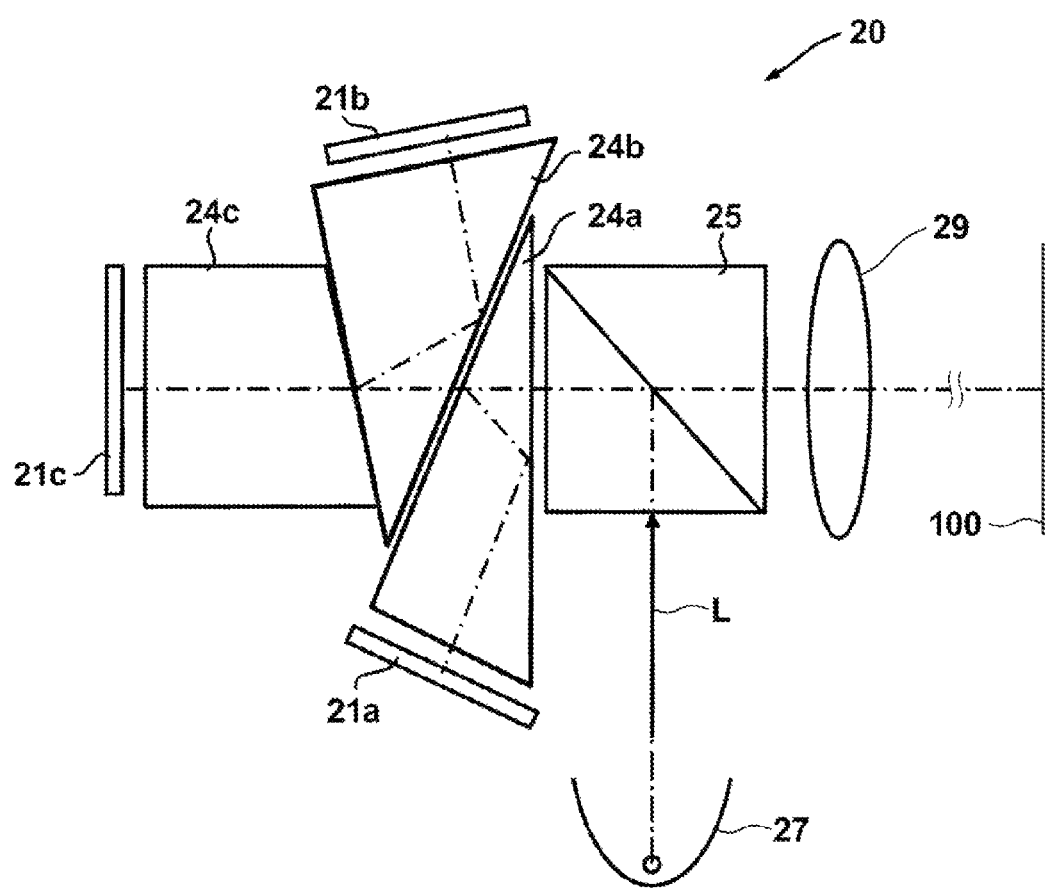

FIG. 24 is a diagram that illustrates the schematic configuration of a projection type display device according to another embodiment of the present invention.

BEST MODE FOR CARRYING OUT THE INVENTION

Hereinafter, embodiments of the present invention will be described in detail with reference to the accompanying drawings. First, a projection zoom lens according to an embodiment of the present invention will be described with reference to FIG. 1. FIG. 1 illustrates the positions of lens groups of a projection zoom lens according to Example 1 of the present invention at a wide angle end, a telephoto end, and an intermediate position, when zooming operations are performed. The manner in which projection zoom lenses are illustrated is the same in FIGS. 1 through 11.

FIG. 2 through FIG. 11 are collections of sectional diagrams that illustrate other examples of the configurations of projection zoom lenses according to embodiments of the present invention. Each of the projection zoom lenses illustrated in FIGS. 2 through 11 respectively correspond to projection zoom lenses of Examples 2 through 11 to be described later. Among these projection zoom lenses, the projection zoom lenses of Examples 1 through 9 are those having six group configurations, and the projection zoom lenses of Examples 10 and 11 are those having five group configurations.

<<Embodiments Having Six Group Configurations>>

First, the projection zoom lenses of Examples 1 through 9 that have six group configurations will be described. The basic configurations of these projection zoom lenses are similar to that of Example 1 other than portions that will be particularly described in detail. Therefore, the embodiments will be described mainly with reference to the configuration illustrated in FIG. 1.

The projection zoom lens of the present embodiment is capable of being mounted in a projection type display device for displaying digital projected images for use in cinema theaters and the like. For example, the projection zoom lens of the present embodiment may be utilized as a projection lens that projects image information displayed by a light valve onto a screen. In FIG. 1, the left side is the magnification side, and the right side is the reduction side. FIG. 1 also illustrates glass blocks 2 and 1 that function as color combining prisms and the like (including filters, etc.), presuming a case in which the projection zoom lens is mounted on a projection type display device. This applies to FIGS. 2 through 11 as well. Note that an image display surface of the light valve is positioned at the surface of the glass block 1 toward the reduction side, for example.

In the projection type display device, light beams, to which the image information is imparted by the image display surface, enter the projection zoom lens via the glass blocks 2 and 1. The projection zoom lens projects the beams onto a screen (not shown) disposed toward the left side direction of the drawing sheet.

Note that although the position of the surface of the glass block 2 toward the reduction side and the position of the image display surface are the same in the above description, the projection zoom lens of the present invention is not limited to such a configuration. In addition, there is only one image display surface in the above description. However, the projection type display device may be configured to separate beams from a light source into three primary colors with a color separating optical system. In this case, three light valves that respectively correspond to the three primary colors may be provided, to enable display of full color images.

The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; a fifth lens group G5 which is positioned at the reduction side after the fourth lens group G4, has a negative refractive power, and moves while changing magnification; and a sixth lens group G6, which is provided most toward the reduction side, has a positive refractive power, and is fixed while changing magnification. The projection zoom lens of the present embodiment is configured such that the reduction side is telecentric. The configuration of the lens groups described above is common to Examples 1 through 4. Note that in the present embodiment, the second through fifth lens groups constitute the intermediate group of the present invention.

This projection zoom lens is configured to perform focusing operations by moving the first lens group G1.

In the example illustrated in FIG. 1, the first lens group G1 is constituted by four lenses (a first lens L1 through a fourth lens L4), the second lens group G2 is constituted by two lenses (a fifth lens L5 and a sixth lens L6), the third lens group G3 is constituted by two lenses (a seventh lens L7 and an eighth lens L8), the fourth lens group G4 is constituted by a single lens (a ninth lens L9) and an aperture stop St positioned at the magnification side thereof, the fifth lens group G5 is constituted by five lenses (a tenth lens L10 through a fourteenth lens L14), and the sixth lens group G6 is constituted by a single lens (a fifteenth lens L15).

However, the numbers of lenses that constitute each of the lens groups are not necessarily limited to those of the example illustrated in FIG. 1. For example, in the projection zoom lens of Example 2 to be described later, a sixth lens group G6 is constituted by two lenses.

In the projection zoom lens of the present embodiment, the aperture stop St provided in the fourth lens group G4 is a variable stop that changes the aperture diameter thereof such that the numerical aperture of the zoom lens is constant through the entire zoom range. This point is also common to all of the other Examples other than Example 9, including cases in which the position at which the aperture stop St is provided is different.

The projection zoom lens of the present embodiment satisfies Conditional Formulae (1) and (2) below.

$$1.00 < (Rf2 - Rr2)/(Rf2 + Rr2) \tag{1}$$

$$0.00 \leq (Rr2 - Rf3)/(Rr2 + Rf3) < 0.15 \tag{2}$$

wherein Rf2 is the radius of curvature of the front surface of the second lens from the magnification side within the lens group most toward the reduction side from among the lens groups that move while changing magnification, Rr2 is the radius of curvature of the rear surface of the second lens from the magnification side within the lens group most toward the reduction side from among the lens groups that move while changing magnification, and Rf3 is the radius of curvature of the front surface of the third lens from the magnification side within the lens group most toward the reduction side from among the lens groups that move while changing magnification.

The projection zoom lens of the present embodiment is capable of maintaining high performance even when configured to have a high zoom ratio, by Conditional Formulae (1) and (2) being satisfied. Particularly, it will become possible to suppress fluctuations in spherical aberration, distortion, and field curvature caused by changes in magnification.

Note that values of each of the Examples related to the conditions defined in Conditional Formulae (1) through (10) are summarized and shown in Table 24. In addition, Table 25 shows conditions related to Conditional Formulae (1) through (10) as well as other main conditions of the Examples. In Table 25, f2, f4, and f5 are the focal lengths of the second lens group, the fourth lens group, and the fifth lens group, respectively.

The projection zoom lens of the present embodiment satisfies Conditional Formulae (3) and (4) below:

$$0 < Nd1 - Nd2 \quad (3)$$

$$Nd2 < 1.60 \quad (4)$$

wherein Nd1 is the refractive index with respect to the d line of the first lens from the magnification side within the lens group most toward the reduction side from among the lens groups that move while changing magnification, and Nd2 is the refractive index with respect to the d line of the second lens from the magnification side within the lens group most toward the reduction side from among the lens groups that move while changing magnification.

The advantageous effects obtained by Conditional Formulae (1) and (2) being satisfied are more prominent, by the projection zoom lens of the present embodiment satisfying Conditional Formulae (3) and (4).

In the present embodiment, aforementioned Conditional Formula (4') is satisfied within the range defined by Conditional Formula (4). Therefore, the above advantageous effects are even more prominent.

In addition, the zoom lens of the present embodiment satisfies Conditional Formula (5) below.

$$1.4 < Zr \quad (5)$$

wherein Zr is the zoom ratio of the telephoto end with respect to the wide angle end. Thereby, the projection zoom lens of the present embodiment secures a high zoom ratio and the utilizable range thereof can be broadened.

In addition, the projection zoom lens of the present embodiment satisfies Conditional Formula (6) below.

$$-2.0 < f1/fw < -0.8 \quad (6)$$

wherein f1 is the focal length of the first lens group, and fw is the focal length of the entire system at the wide angle end. Thereby, the projection zoom lens of the present embodiment is being capable of being formed compact, can secure a sufficient amount of back focus, and further can suppress field curvature and distortion. The detailed reasons therefor are as described earlier.

The present embodiment satisfies aforementioned Conditional Formula (6') within the range defined by Conditional Formula (6). Therefore, the above advantageous effects are particularly prominent.

The projection zoom lens of the present embodiment satisfies Conditional Formula (7) below.

$$2.0 < fe/fw < 7.0 \quad (7)$$

wherein fe is the focal length of the final lens group G6, and fw is the focal length of the entire system at the wide angle end. Thereby, the projection zoom lens of the present embodiment can favorably correct spherical aberration, can reduce the outer diameters of the lenses of the first lens groups toward the magnification side, resulting in being capable of being formed compact, and further can suppress the amount of spherical aberration at the telephoto end. The detailed reasons therefor are as described earlier.

The present embodiment satisfies aforementioned Conditional Formula (7') within the range defined by Conditional Formula (7). Therefore, the above advantageous effects are particularly prominent.

Further, in the projection zoom lens of the present embodiment, the intermediate group comprises the second lens group G2 having a positive refractive power that moves while changing magnification and the third lens group G3 having a positive refractive power that moves while changing magnification, provided in this order from the magnification side, and all of the Examples other than Examples 1 and 2 satisfy Conditional Formula (8) below.

$$3.0 < f3/fw < 8.0 \quad (8)$$

wherein f3 is the focal length of the third lens group, and fw is the focal length of the entire system at the wide angle end. In this case, the projection zoom lens of the present embodiment will be capable of favorably correcting field curvature and lateral chromatic aberration, while suppressing the total length of the projection zoom lens. The reasons therefor are as described in detail previously.

In addition, the projection zoom lens of the present embodiment satisfies Conditional Formulae (9) and (10) below.

$$2.5 < Bf/Im\phi \quad (9)$$

$$L/Im\phi < 12 \quad (10)$$

wherein Bf is the back focus (an air converted length) of the entire system at the reduction side at the wide angle end, Imφ is the maximum effective image circle diameter (image circle diameter) at the reduction side, and L is the distance along the optical axis from the lens surface most toward the magnification side (the surface of the first lens L1 toward the magnification side) to the lens surface most toward the reduction side (the surface of the fifteenth lens L15 toward the reduction side) when the projection distance is infinity. The projection zoom lens of the present embodiment is capable of having a sufficiently long back focus, by Conditional Formula (9) being satisfied. As a result, insertion of the aforementioned prism will be facilitated. The reason therefor is as described in detail earlier.

The present embodiment further satisfies aforementioned Conditional Formula (9') within the range defined by Conditional Formula (9). Therefore, the above advantageous effects are particularly prominent.

Meanwhile, the total length of the projection zoom lens of the present embodiment can be shortened, by Conditional Formula (10) being satisfied.

The present embodiment further satisfies Conditional Formula (10') within the range defined by Conditional Formula (10). Therefore, the above advantageous effect is particularly prominent, and chromatic aberration can be favorably corrected.

Figure 5:
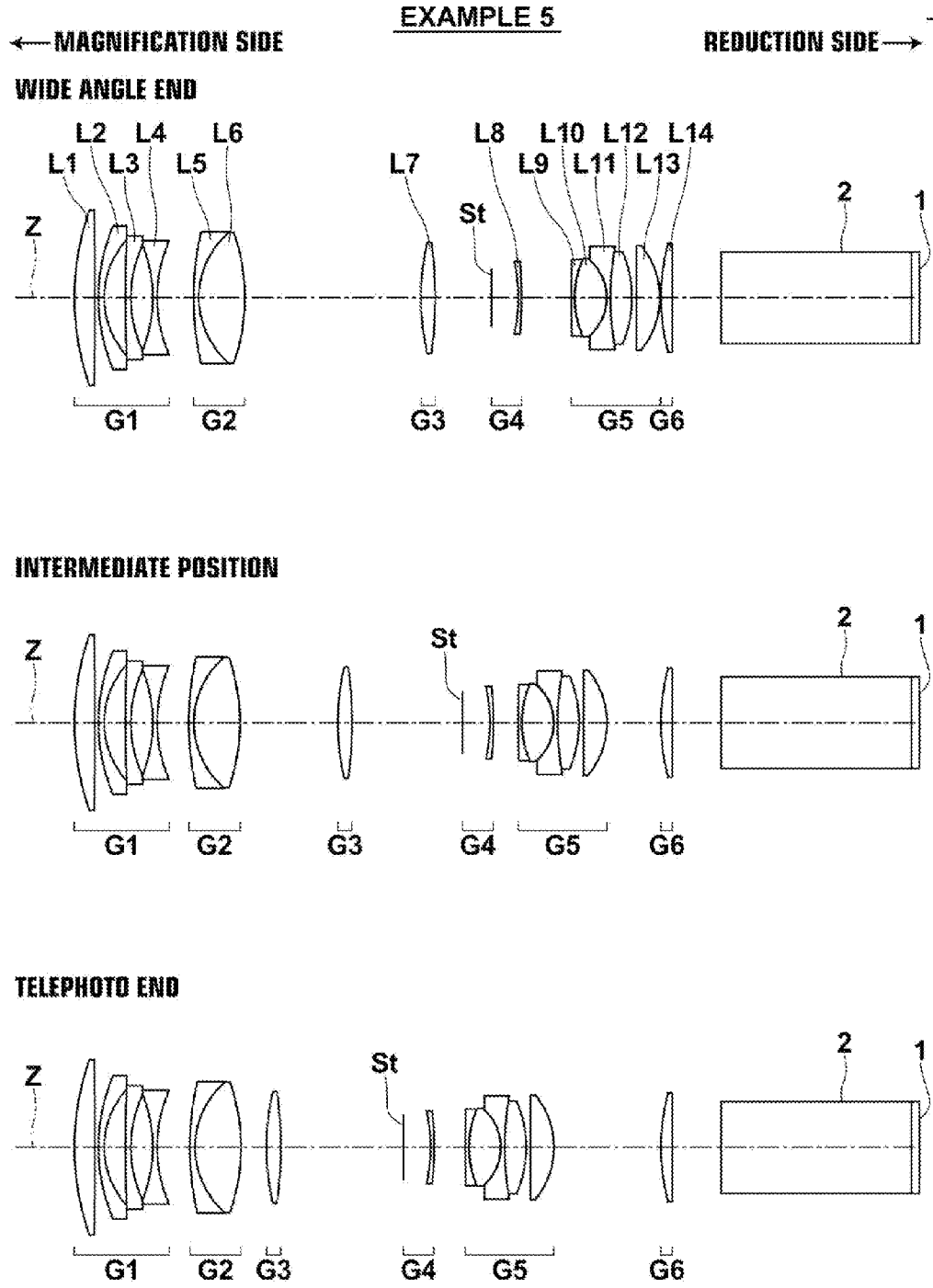
FIG. 5 is a collection of sectional diagrams that illustrate the lens configuration of a projection zoom lens according to Example 5 of the present invention.

Next, embodiments having six group configurations different from the configuration of the lens groups described above will be described. The projection zoom lens according to an embodiment, of which sectional diagrams are illustrated in FIG. 5, corresponds to the projection zoom lens of Example 5 to be described later. The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a negative refractive power, and moves while changing magnification; a fifth lens group G5 which is positioned at the reduction side after the fourth lens group G4, has a positive refractive power, and moves while changing magnification; and a sixth lens group G6, which is provided most toward the reduction side, has a positive refractive power, and is fixed while changing magnification. The projection zoom lens of the present embodiment is configured such that the reduction side is telecentric. The configuration of the lens groups described above is common to Examples 5 and 6. Note that in the present embodiment, the second through fifth lens groups constitute the intermediate group of the present invention.

The above configuration differs from that of the projection zoom lens of Example 1 described previously in the points that the fourth lens group G4 has a negative refractive power, and the fifth lens group G5 has a positive refractive power.

The projection zoom lens of Example 5 and Example 6 according to the embodiment illustrated in FIG. 5 satisfy all of Conditional Formulae (1) through (10), and further satisfy Conditional Formulae (4'), (6'), (7'), (9'), and (10'). The advantageous effects obtained thereby are the same as those described previously.

Figure 7:
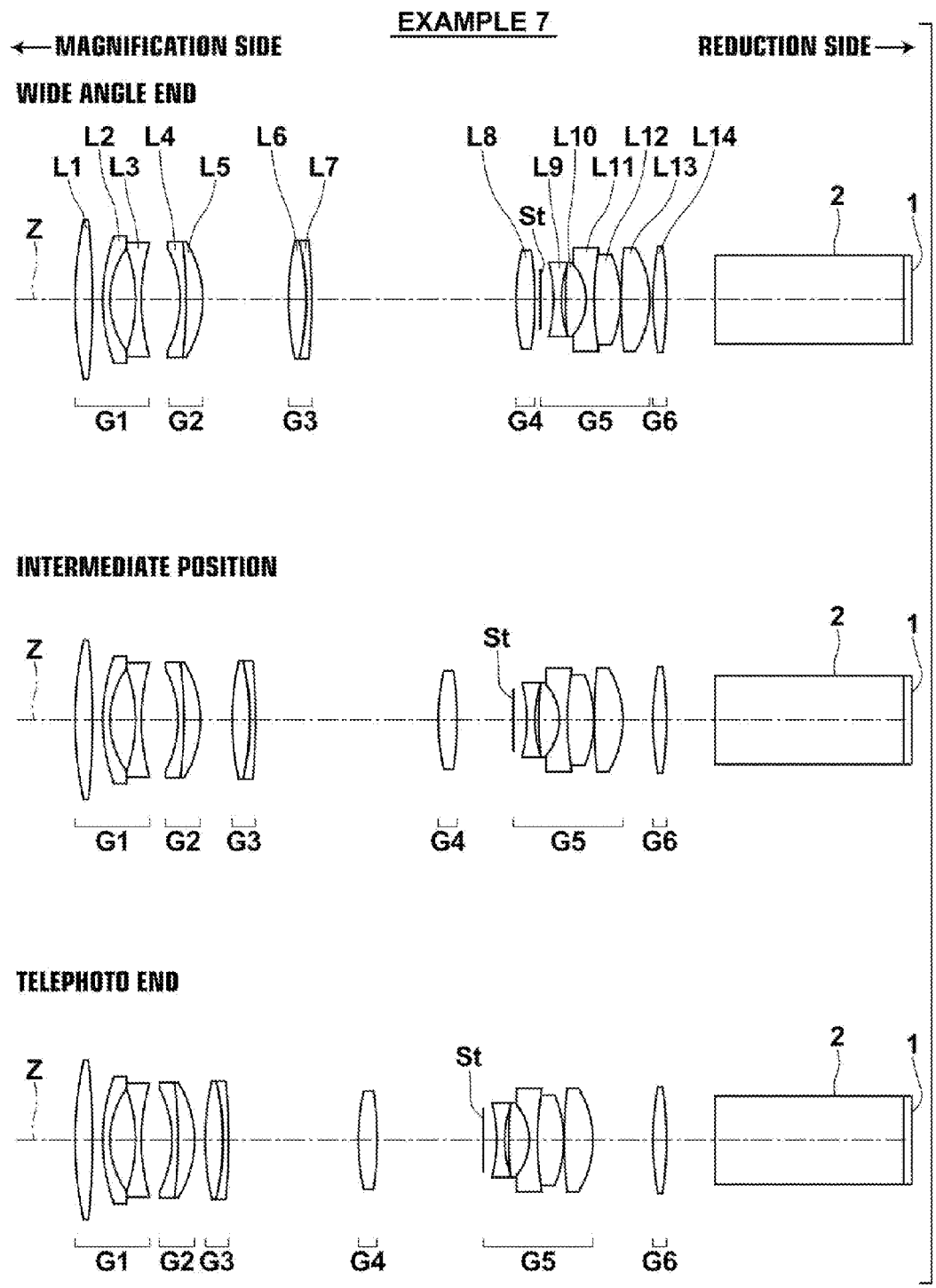
FIG. 7 is a collection of sectional diagrams that illustrate the lens configuration of a projection zoom lens according to Example 7 of the present invention.

Next, other embodiments having six group configurations which are again different from the configuration of the lens groups described above will be described. The projection zoom lens according to an embodiment, of which sectional diagrams are illustrated in FIG. 7, corresponds to the projection zoom lens of Example 7 to be described later. The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; a fifth lens group G5 which is positioned at the reduction side after the fourth lens group G4, has a positive refractive power, and moves while changing magnification; and a sixth lens group G6, which is provided most toward the reduction side, has a positive refractive power, and is fixed while changing magnification. The projection zoom lens of the present embodiment is configured such that the reduction side is telecentric. The configuration of the lens groups described above is common to Examples 7 through 9. Note that in the present embodiment, the second through fifth lens groups constitute the intermediate group of the present invention.

The above configuration basically differs from that of the projection zoom lens of Example 1 described previously in the point that the fifth lens group G5 has a positive refractive power.

The projection zoom lens of Example 7, 8, and 9 according to the embodiment illustrated in FIG. 7 satisfy all of Conditional Formulae (1) through (10) except that Example 8 does not satisfy Conditional Formula (3). Further, Examples 7 through 9 satisfy Conditional Formulae (4'), (6'), (7'), (9'), and (10'). The advantageous effects obtained thereby are the same as those described previously.

<<Embodiments Having Five Group Configurations>>

Next, embodiments having five group configurations will be described with reference mainly to FIG. 10. The projection zoom lens according to an embodiment, of which sectional diagrams are illustrated in FIG. 10 corresponds to a projection zoom lens of Example 10 to be described later. The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; and a fifth lens group G5, which is provided most toward the reduction side, has a positive refractive power, and is fixed while changing magnification. The projection zoom lens of the present embodiment is configured such that the reduction side is telecentric. The configuration of the lens groups described above is common to Examples 10 and 11. Note that in the present embodiment, the second through fourth lens groups constitute the intermediate group of the present invention.

In the example illustrated in FIG. 10, the first lens group G1 is constituted by five lenses (a first lens L1 through a fifth lens L5), the second lens group G2 is constituted by two lenses (a sixth lens L6 and a seventh lens L7), the third lens group G3 is constituted by a single lens (an eighth lens L8), the fourth lens group G4 is constituted by five lenses (a ninth lens L9 through a thirteenth lens L13) and an aperture stop St positioned at the magnification side thereof, and the fifth lens group G5 is constituted by a single lens (a fourteenth lens L14). However, the numbers of lenses that constitute each of the lens groups are not necessarily limited to those of the example illustrated in FIG. 10.

The projection zoom lens of Example 10 and 11 according to the embodiment illustrated in FIG. 10 satisfy all of Conditional Formulae (1) through (10) except that Example 10 does not satisfy Conditional Formula (6). Further, Examples 10 and 11 satisfy all of Conditional Formulae (4'), (6'), (7'), (9'), and (10') except that Example 10 and 11 does not satisfy Conditional Formula (6'). The advantageous effects obtained thereby are the same as those described previously.

Next, embodiments of a projection type display device of the present invention will be described with reference to FIGS. 23 and 24. FIG. 23 is a schematic diagram that illustrates a portion of a projection type display device according to an embodiment of the present invention. The projection type display device illustrated in FIG. 23 is equipped with an illuminating optical system 10 including: reflective display elements 11a through 11c as light valves corresponding to light of each of three colors; dichroic mirrors 12 and 13 for separating colors; a cross dichroic prism 14 for combining colors; a total reflection mirror 18 for deflecting an optical path; and polarization splitting prisms 15a through 15c. Note that a light source 17 that emits white light L is provided in front of the dichroic mirror 12.

The white light L output by the light source 17 is separated into three colored light beams (G light, B light, and R light) by the dichroic mirrors 12 and 13. The three colored light beams pass through the polarization splitting prisms 15a through 15c, then enter the reflective display elements 11a through 11c corresponding each of the light beams and are optically modulated thereby. Then, the colored light beams are combined by the cross dichroic prism 14, and enter a projection zoom lens 19 according to an embodiment of the present invention. The projection zoom lens 19 projects an optical image formed by the light that enters thereinto onto a screen 100.

Next, FIG. 24 is a schematic diagram that illustrates a portion of a projection type display device according to another embodiment of the present invention. The projection type display device illustrated in FIG. 38 is equipped with an illuminating optical system 20 including: reflective display elements 21a through 21c as light valves corresponding to light of each of three colors; TIR (Total Internal Reflection) prisms 24a through 24c for separating and combining colors; and a polarization splitting prism 25. Note that a light source 27 that emits white light L is provided in front of the polarization splitting prism 25.

The white light L output by the light source 27 passes through the polarization splitting prism 25, then is separated into three colored light beams (G light, B light, and R light) by the TIR prisms 24a through 24c. The three colored light beams enter the reflective display elements 21a through 21c corresponding each of the light beams and are optically modulated thereby. Then, the optically modulated light beams propagate through the TIR prisms 24a through 24c in the reverse direction such that the colors are combined, pass through the polarization splitting prism 25, and enter a projection zoom lens 29 according to an embodiment of the present invention. The projection zoom lens 29 projects an optical image formed by the light that enters thereinto onto a screen 100.

Note that reflective liquid crystal display elements, DMD's, or the like may be employed as the reflective display elements 11a through 11c and 21a through 21c. FIGS. 23 and 24 illustrate examples in which reflective display elements are employed as the light valves. However, the light valves provided in the projection type display device of the present invention is not limited to these examples, and transmissive display elements, such as transmissive liquid crystal display elements may alternatively be employed Next, specific examples of the projection zoom lens of the present invention will be described. Note that the projection zoom lenses of Examples 1 through 9 to be described hereunder all have six group configurations, and the projection zoom lenses of Examples 10 and 11 both have five group configurations.

Example 1

FIG. 1 illustrates the positions of lens groups of a projection zoom lens according to Example 1 of the present invention at a wide angle end, a telephoto end, and an intermediate position between the two. Because a description has already been given regarding FIG. 1, redundant descriptions will be omitted here.

In the projection zoom lens of Example 1, the first lens group G1 is constituted by four lenses, which are a first lens L1 having a positive refractive power (hereinafter, lenses will simply be referred to as "positive" or "negative"), a negative second lens L2, a negative third lens L3, and a negative fourth lens L4, provided in this order from the magnification side. The second lens group G2 is constituted by two lenses, which are a negative fifth lens L5 and a positive sixth lens L6, provided in this order from the magnification side.

The third lens group G3 is constituted by two lenses, which are a positive seventh lens L7 and a negative eighth lens L8, provided in this order from the magnification side. The fourth lens group G4 is constituted by an aperture stop St, which is a variable stop, and a positive ninth lens L9.

The fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. The sixth lens group G6 is constituted by a single positive fifteenth lens L15. Note that the twelfth lens L12 and the thirteenth lens L13 are cemented together.

Table 1 shows basic lens data of the projection zoom lens of Example 1. Data regarding glass blocks 2 and 1 are also shown here. In Table 1, ith (i=1, 2, 3, . . . ) lens surface numbers that sequentially increase from the magnification side to the reduction side, with the lens surface at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) constituent elements that sequentially increase from the magnification side to the reduction side, with the lens at the most magnification side designated as first, with respect to the d line (wavelength: 587.6 nm) are shown in the column Ndj. The Abbe's numbers of the jth constituent elements with respect to the d line are shown in the column vdj.

Note that the radii of curvature R and the values of the distances D are values which are normalized by designating the focal length of the entire projection zoom lens at the wide angle end as 10.00. In addition, Table 1 shows numerical values which are rounded off at a predetermined number of digits. In addition, in Table 1, the signs of the radii of curvature are positive in cases that the surface shape is convex toward the magnification side, and negative in cases that the surface shape is convex toward the reduction side.

Among the distances D, the distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6 change when changing magnification. The letters "DD" are appended to the surface number toward the front of these distances and shown as DD8, DD11, DD15, DD18, and DD27 in the columns of the distances between surfaces corresponding to these distances.

The above is the same for Tables 3, 5, 7, 9, 11, 14, 16, 18, 20, and 22 to be described later. Note that with respect to the aforementioned variable distances among lens groups, the number that follows the letters "DD" are different according to the number of constituent elements in each Example. However, that letters "DD" are appended to the surface number toward the front of these distances is the same in all of the above tables. In addition, the symbol "*" is appended to aspherical surfaces.

Table 2 shows the values of the focal length f of the entire system, the back focus Bf (air converted distance), the distances DD8, DD11, DD15, DD18, and DD27, and the stop diameter of the aperture stop (aperture diameter: represented as diameters) of the projection zoom lens of Example 1 when changing magnification at the wide angle end, the intermediate position, and the telephoto end. These numerical values are also values which are normalized by designating the focal length of the entire projection zoom lens at the wide angle end as 10.00. In addition, these values are for a case in which the projection distance is infinity. In addition, Table 2 also shows the values of the zoom magnification rate (designating the wide angle end as 1.00), the F number (numerical aperture) FNo., and the full angle of view 2ω (using degrees as the unit) of the zoom lens of Example 1. The F number is maintained constant at 2.5, which is sufficiently smaller than the aforementioned value of 3.0. This is the same for Examples 2 through 11 to be described later.

The manner in which the items of Table 2 are shown is the same for Tables 4, 6, 8, 10, 12, 15, 17, 19, 21, and 23 as well.

TABLE 1

Example 1: Basic Lens Data

| Si (Surface Number) | Ri (Radius of Curvature) | Di (Distance) | Ndj (Refractive Index) | vdj (Abbe's Number) |
|---|---|---|---|---|
| 1 | 71.9343 | 3.715 | 1.62299 | 58.16 |
| 2 | ∞ | 0.107 | | |
| 3 | 39.2386 | 1.148 | 1.61800 | 63.33 |
| 4 | 19.4267 | 3.886 | | |
| 5 | 61.3212 | 0.966 | 1.71299 | 53.87 |
| 6 | 23.6763 | 5.903 | | |
| 7 | −30.5448 | 0.858 | 1.61800 | 63.33 |
| 8 | 81.9992 | DD [8] | | |
| 9 | ∞ | 0.971 | 1.84661 | 23.78 |
| 10 | 27.2828 | 6.802 | 1.72047 | 34.71 |
| 11 | −44.9101 | DD [11] | | |
| 12 | 35.6924 | 3.256 | 1.67270 | 32.10 |
| 13 | −164.3529 | 5.921 | | |
| 14 | 39.5138 | 0.805 | 1.49700 | 81.54 |
| 15 | 16.1272 | DD [15] | | |
| 16 (aperture stop) | ∞ | 8.985 | | |
| 17 | 132.4478 | 2.145 | 1.49700 | 81.54 |
| 18 | −25.7826 | DD [18] | | |
| 19 | −27.4801 | 0.536 | 1.61772 | 49.81 |
| 20 | 27.4801 | 0.579 | | |
| 21 | 103.8717 | 2.379 | 1.48749 | 70.23 |
| 22 | −16.3936 | 0.473 | | |
| 23 | −12.5784 | 0.649 | 1.77250 | 49.60 |
| 24 | 52.1011 | 3.203 | 1.49700 | 81.54 |
| 25 | −18.1370 | 3.093 | | |
| 26 | 252.4568 | 4.204 | 1.49700 | 81.54 |
| 27 | −18.6515 | DD [27] | | |
| 28 | 52.7115 | 2.898 | 1.49700 | 81.54 |
| 29 | −52.7115 | 9.661 | | |
| 30 | ∞ | 37.550 | 1.51633 | 64.14 |
| 31 | ∞ | 1.609 | 1.50847 | 61.19 |
| 32 | ∞ | | | |

TABLE 2

Example 1: Data Related to Zoom

| | Wide Angle | Intermediate | Telephoto |
|---|---|---|---|
| Zoom Ratio | 1.00 | 1.20 | 1.43 |
| f | 10.00 | 11.96 | 14.30 |
| Bf | 35.49 | 35.49 | 35.49 |
| FNo. | 2.50 | 2.50 | 2.50 |
| 2ω (°) | 62.8 | 54.2 | 46.2 |
| DD [8] | 15.342 | 10.968 | 9.388 |
| DD [11] | 14.078 | 8.183 | 0.654 |
| DD [15] | 24.171 | 23.075 | 22.125 |
| DD [18] | 0.776 | 7.024 | 13.512 |
| DD [27] | 0.269 | 5.386 | 8.956 |

TABLE 2-continued

Example 1: Data Related to Zoom

| | Wide Angle | Intermediate | Telephoto |
|---|---|---|---|
| Stop Diameter | 10.858 | 12.28 | 13.678 |

Here, the spherical aberration, the astigmatism, the distortion, and the lateral chromatic aberration (chromatic aberration of magnification) of the projection zoom lens of Example 1 at the wide angle end are respectively illustrated in A through D of FIG. 12. The spherical aberration, the astigmatism, the distortion, and the lateral chromatic aberration of the projection zoom lens of Example 1 at the intermediate position are respectively illustrated in E through H of FIG. 12. The spherical aberration, the astigmatism, the distortion, and the lateral chromatic aberration of the projection zoom lens of Example 1 at the telephoto end are respectively illustrated in I through L of FIG. 12. As shown in these figures, distortion is suppressed to approximately 2% or less through the entire zoom range in Example 1. This is approximately the same for all of the other Examples 2 through 11 as well.

Each of A through L of FIG. 12, which are diagrams that illustrate the aberrations, use the d line (wavelength: 587.6 nm) as a standard. However, aberrations related to the C line (wavelength: 656.3 nm) and the F line (wavelength: 486.1 nm) are also shown in the diagrams that illustrate spherical aberration. In addition, the diagrams that illustrate lateral chromatic aberration also show aberrations related to the C line and the F line. In the diagrams that illustrate astigmatism, aberrations in the sagittal direction are indicated by solid lines, while aberrations in the tangential direction are indicated by broken lines. In the diagrams that illustrate spherical aberrations, "FNo." denotes F numbers. In the other diagrams that illustrate the aberrations, w denotes half angles of view. Note that these values are for a case in which the projection distance is infinity.

The diagrams of lens arrangements, the symbols in the Tables and the diagrams that illustrate aberrations, the meanings thereof, and the manners in which they are shown for Example 1 basically apply to Examples 2 through 11 to be described below, unless otherwise noted. In addition, the points that the lens arrangement diagrams of Example 1 (FIG. 1) are those for the wide angle end, an intermediate position, and the telephoto end, and that the diagrams that illustrate aberrations are those for the wide angle end, an intermediate position, and the telephoto end are also the same for Examples 2 through 11 as well.

Example 2

FIG. 2 illustrates the arrangements of lens groups of the projection zoom lens of Example 2 at the wide angle end, the telephoto end, and an intermediate position between the wide angle end and the telephoto end. In Example 2, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens L6, provided in this order from the magnification side.

A third lens group G3 is constituted by two lenses, which are a positive seventh lens L7 and a negative eighth lens L8, provided in this order from the magnification side. A fourth lens group G4 is constituted by and an aperture stop St, which is a variable stop, and a positive ninth lens L9 provided in this order from the magnification side.

A fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. A sixth lens group G6 is constituted by a two lenses, which are a negative fifteenth lens L15 and a positive sixteenth lens L16.

Note that the fifth lens L5 and the sixth lens L6 are cemented together, the twelfth lens L12 and the thirteenth lens L13 are cemented together, and the fifteenth lens L15 and the sixteenth lens L16 are cemented together as well.

Table 3 shows basic lens data of the projection zoom lens of Example 2. In addition, Table 4 shows data related to items at the wide angle end, the intermediate position, and the telephoto end as the projection zoom lens of Example 2 changes magnification, in the same manner as Table 2. The items and the manners in which they are shown are as described previously.

TABLE 3

Example 2: Basic Lens Data

| Si (Surface Number) | Ri (Radius of Curvature) | Di (Distance) | Ndj (Refractive Index) | vdj (Abbe's Number) |
|---|---|---|---|---|
| 1 | 47.6244 | 4.170 | 1.62299 | 58.16 |
| 2 | 342.8017 | 0.107 | | |
| 3 | 38.4051 | 1.147 | 1.61800 | 63.33 |
| 4 | 17.8824 | 4.848 | | |
| 5 | 82.6651 | 0.965 | 1.71299 | 53.87 |
| 6 | 22.3424 | 6.268 | | |
| 7 | −25.5241 | 0.857 | 1.61800 | 63.33 |
| 8 | 195.3033 | DD [8] | | |
| 9 | −57.4995 | 0.970 | 1.84661 | 23.78 |
| 10 | 36.2694 | 6.107 | 1.74950 | 35.33 |
| 11 | −28.6044 | DD [11] | | |
| 12 | 36.6738 | 2.742 | 1.71736 | 29.52 |
| 13 | −286.0788 | 1.765 | | |
| 14 | 34.3412 | 0.804 | 1.49700 | 81.54 |
| 15 | 18.7183 | DD [15] | | |
| 16 (aperture stop) | ∞ | 8.975 | | |
| 17 | 139.0259 | 2.143 | 1.49700 | 81.54 |
| 18 | −29.3123 | DD [18] | | |
| 19 | −27.4161 | 0.536 | 1.78800 | 47.37 |
| 20 | 27.6022 | 0.493 | | |
| 21 | 61.9035 | 2.880 | 1.51742 | 52.43 |
| 22 | −16.0045 | 0.454 | | |
| 23 | −12.9940 | 0.648 | 1.78800 | 47.37 |
| 24 | 27.7002 | 3.574 | 1.61800 | 63.33 |
| 25 | −25.4591 | 0.000 | | |
| 26 | 65.3022 | 3.855 | 1.61800 | 63.33 |
| 27 | −21.3736 | DD [27] | | |
| 28 | 46.6856 | 0.755 | 1.71299 | 53.87 |
| 29 | 21.6274 | 4.635 | 1.49700 | 81.54 |
| 30 | −37.7068 | 9.646 | | |
| 31 | ∞ | 37.509 | 1.51633 | 64.14 |
| 32 | ∞ | 1.608 | 1.50847 | 61.19 |
| 33 | ∞ | | | |

TABLE 4

Example 2: Data Related to Zoom

| | Wide Angle | Intermediate | Telephoto |
|---|---|---|---|
| Zoom Ratio | 1.00 | 1.20 | 1.43 |
| f | 10.00 | 11.96 | 14.30 |
| Bf | 35.45 | 35.45 | 35.45 |
| FNo. | 2.50 | 2.50 | 2.50 |

TABLE 4-continued

Example 2: Data Related to Zoom

| | Wide Angle | Intermediate | Telephoto |
|---|---|---|---|
| 2ω (°) | 62.8 | 54.2 | 46.2 |
| DD [8] | 6.954 | 4.636 | 5.053 |
| DD [11] | 15.673 | 9.320 | 0.531 |
| DD [15] | 34.389 | 32.115 | 30.937 |
| DD [18] | 0.931 | 7.963 | 15.246 |
| DD [27] | 0.269 | 4.183 | 6.449 |
| Stop Diameter | 11.298 | 12.734 | 14.12 |

Meanwhile, A through L of FIG. 13 are diagrams that illustrate various aberrations of the projection zoom lens of Example 2.

Example 3

Figure 3:
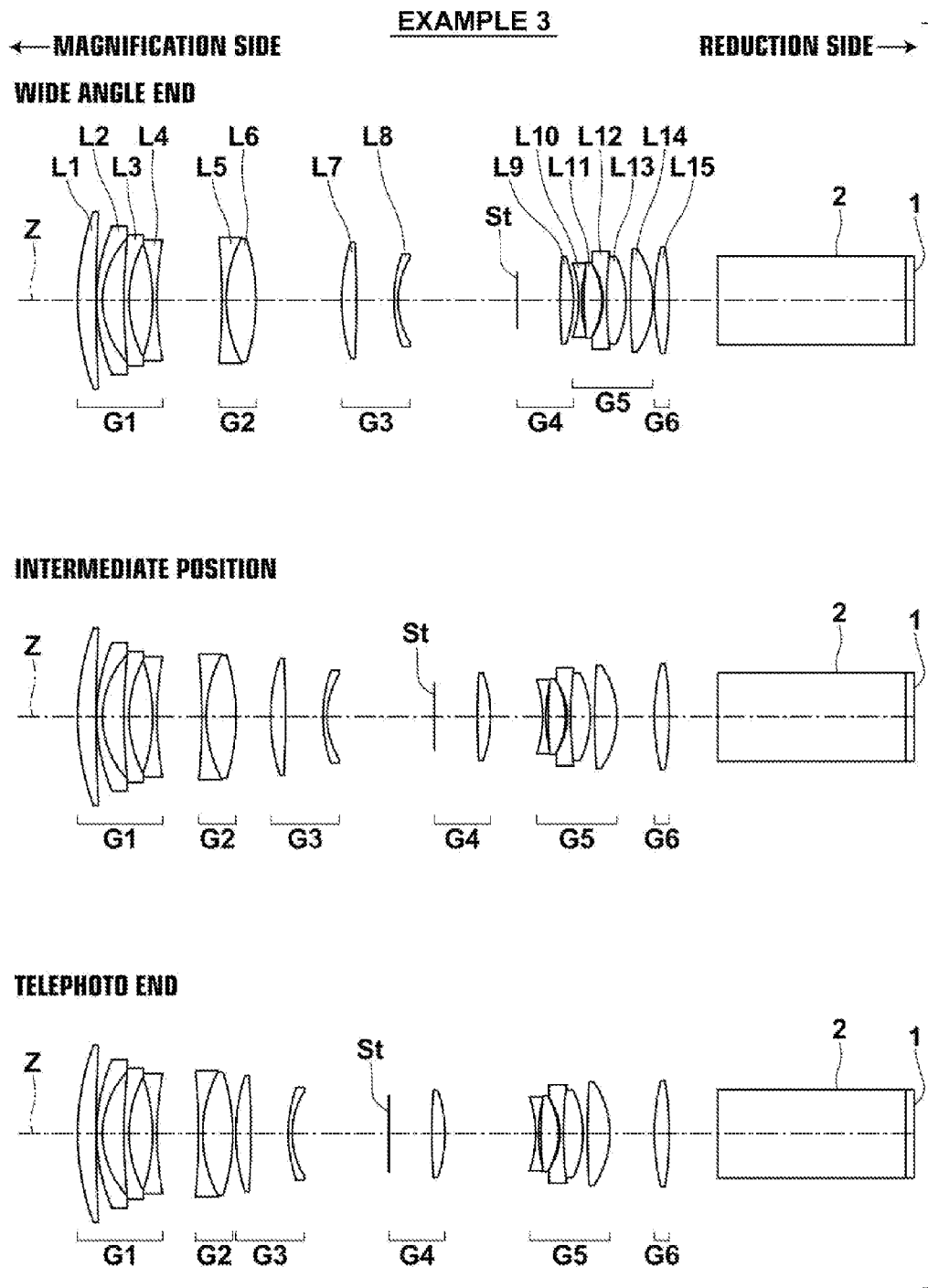
FIG. 3 is a collection of sectional diagrams that illustrate the lens configuration of a projection zoom lens according to Example 3 of the present invention.

FIG. 3 illustrates the arrangements of lens groups of the projection zoom lens of Example 3 at the wide angle end, the telephoto end, and an intermediate position between the wide angle end and the telephoto end. In Example 3, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens, provided in this order from the magnification side.

A third lens group G3 is constituted by two lenses, which are a positive seventh lens L7 and a negative eighth lens L8, provided in this order from the magnification side. A fourth lens group G4 is constituted by an aperture stop St, which is a variable stop, and a positive ninth lens L9, provided in this order from the magnification side.

A fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. A sixth lens group G6 is constituted by a single positive fifteenth lens L15.

Note that the fifth lens L5 and the sixth lens L6 are cemented together, and the twelfth lens L12 and the thirteenth lens L13 are cemented together as well.

Table 5 shows basic lens data of the projection zoom lens of Example 3. In addition, Table 6 shows data related to items at the wide angle end, the intermediate position, and the telephoto end as the projection zoom lens of Example 3 changes magnification, in the same manner as Table 2. The items and the manners in which they are shown are as described previously.

TABLE 5

Example 3: Basic Lens Data

| Si (Surface Number) | Ri (Radius of Curvature) | Di (Distance) | Ndj (Refractive Index) | vdj (Abbe's Number) |
|---|---|---|---|---|
| 1 | 47.0437 | 3.350 | 1.67003 | 47.23 |
| 2 | 330.2142 | 0.097 | | |
| 3 | 34.7902 | 1.015 | 1.62299 | 58.16 |
| 4 | 16.7348 | 3.911 | | |
| 5 | 117.0256 | 0.890 | 1.62041 | 60.29 |
| 6 | 22.4972 | 4.230 | | |
| 7 | −32.0741 | 0.774 | 1.62299 | 58.16 |
| 8 | 60.4108 | DD [8] | | |
| 9 | −119.2924 | 0.779 | 1.84661 | 23.78 |

TABLE 5-continued

Example 3: Basic Lens Data

| Si (Surface Number) | Ri (Radius of Curvature) | Di (Distance) | Ndj (Refractive Index) | vdj (Abbe's Number) |
|---|---|---|---|---|
| 10 | 24.8416 | 5.371 | 1.73800 | 32.26 |
| 11 | −37.2610 | DD [11] | | |
| 12 | 34.9176 | 2.678 | 1.74950 | 35.28 |
| 13 | −188.1975 | 6.730 | | |
| 14 | 25.4222 | 0.725 | 1.48749 | 70.23 |
| 15 | 14.8481 | DD [15] | | |
| 16 (aperture stop) | ∞ | 7.735 | | |
| 17 | 113.1459 | 2.379 | 1.49700 | 81.54 |
| 18 | −24.3331 | DD [18] | | |
| 19 | −21.3273 | 0.532 | 1.74320 | 49.34 |
| 20 | 26.4153 | 0.450 | | |
| 21 | 65.3902 | 3.128 | 1.51633 | 64.14 |
| 22 | −13.4188 | 0.280 | | |
| 23 | −11.7678 | 0.633 | 1.77250 | 49.60 |
| 24 | 71.5360 | 3.486 | 1.49700 | 81.54 |
| 25 | −18.6012 | 0.793 | | |
| 26 | 124.6524 | 4.046 | 1.49700 | 81.54 |
| 27 | −17.0531 | DD [27] | | |
| 28 | 39.7147 | 2.683 | 1.49700 | 81.54 |
| 29 | −63.1218 | 8.717 | | |
| 30 | ∞ | 33.841 | 1.51633 | 64.14 |
| 31 | ∞ | 1.450 | 1.50847 | 61.19 |
| 32 | ∞ | | | |

TABLE 6

Example 3: Data Related to Zoom

| | Wide Angle | Intermediate | Telephoto |
|---|---|---|---|
| Zoom Ratio | 1.00 | 1.32 | 1.58 |
| f | 10.00 | 13.20 | 15.80 |
| Bf | 0.01 | 0.01 | 0.01 |
| FNo. | 2.50 | 2.50 | 2.50 |
| 2ω (°) | 57.8 | 45.2 | 38.4 |
| DD [8] | 11.670 | 8.093 | 7.465 |
| DD [11] | 15.386 | 6.207 | 0.578 |
| DD [15] | 21.430 | 19.285 | 17.350 |
| DD [18] | 0.941 | 9.383 | 16.288 |
| DD [27] | 0.244 | 6.704 | 7.991 |
| Stop Diameter | 10.142 | 12.2748 | 13.7542 |

Meanwhile, A through L of FIG. 14 are diagrams that illustrate various aberrations of the projection zoom lens of Example 3.

Example 4

Figure 4:
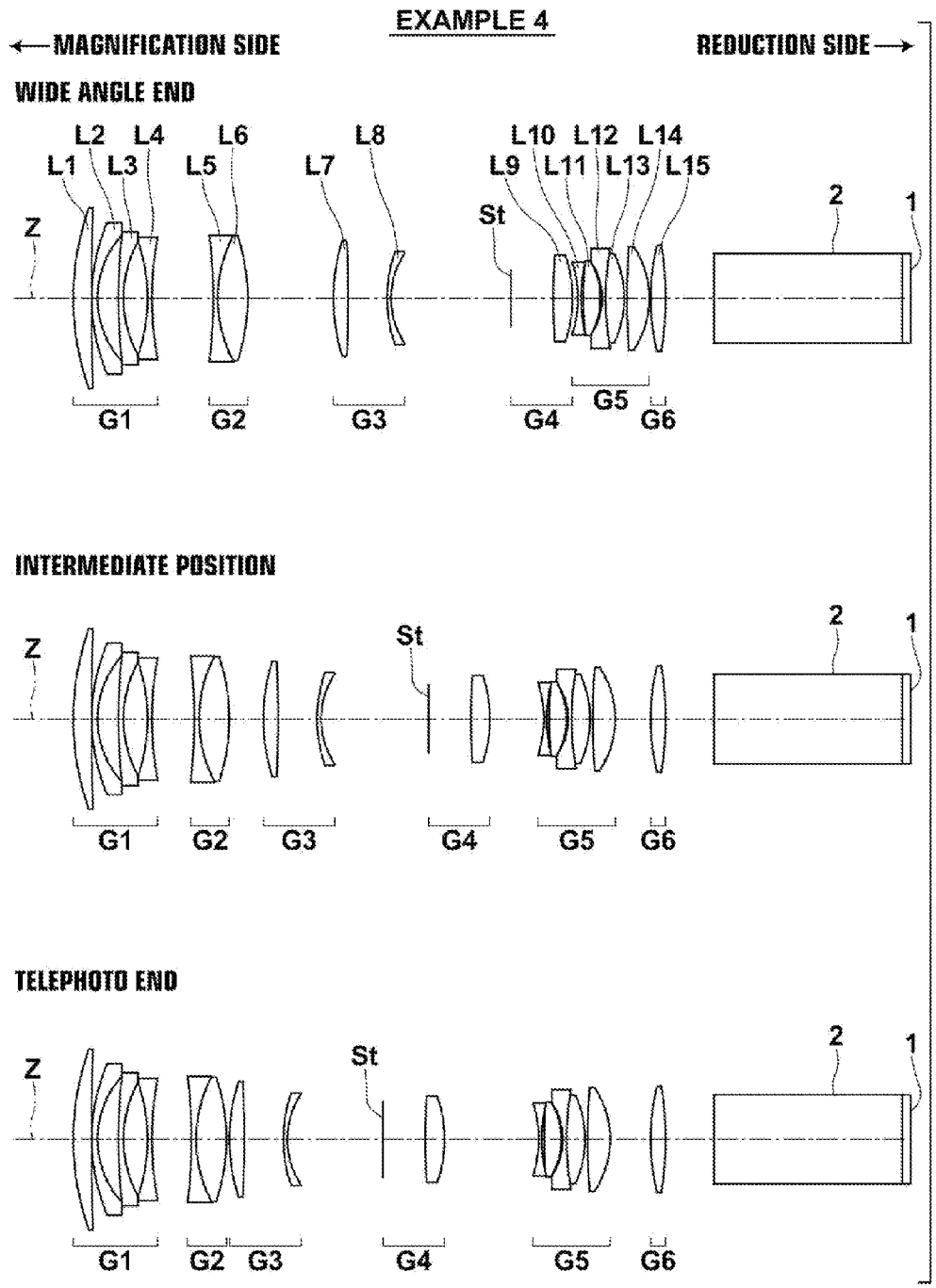
FIG. 4 is a collection of sectional diagrams that illustrate the lens configuration of a projection zoom lens according to Example 4 of the present invention.

FIG. 4 illustrates the arrangements of lens groups of the projection zoom lens of Example 4 at the wide angle end, the telephoto end, and an intermediate position between the wide angle end and the telephoto end. In Example 4, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens L6, provided in this order from the magnification side.

A third lens group G3 is constituted by two lenses, which are a positive seventh lens L7 and a negative eighth lens L8, provided in this order from the magnification side. A fourth lens group G4 is constituted by an aperture stop St, which is a variable stop, and a positive ninth lens L9, provided in this order from the magnification side.

A fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. A sixth lens group G6 is constituted by a single positive fifteenth lens L15.

Note that the fifth lens L5 and the sixth lens L6 are cemented together and the twelfth lens L12 and the thirteenth lens L13 are cemented together as well.

Table 7 shows basic lens data of the projection zoom lens of Example 4. In addition, Table 8 shows data related to items at the wide angle end, the intermediate position, and the telephoto end as the projection zoom lens of Example 4 changes magnification, in the same manner as Table 2. The items and the manners in which they are shown are as described previously.

TABLE 7

Example 4: Basic Lens Data

| Si (Surface Number) | Ri (Radius of Curvature) | Di (Distance) | Ndj (Refractive Index) | vdj (Abbe's Number) |
|---|---|---|---|---|
| 1 | 50.0884 | 3.237 | 1.70154 | 41.24 |
| 2 | 384.8019 | 0.097 | | |
| 3 | 35.9455 | 1.015 | 1.63854 | 55.38 |
| 4 | 17.3466 | 3.760 | | |
| 5 | 108.3901 | 0.894 | 1.62041 | 60.29 |
| 6 | 21.7691 | 4.354 | | |
| 7 | −31.7646 | 0.774 | 1.58913 | 61.14 |
| 8 | 60.9474 | DD [8] | | |
| 9 | −96.9782 | 0.827 | 1.84661 | 23.78 |
| 10 | 24.7320 | 5.402 | 1.73800 | 32.26 |
| 11 | −36.3082 | DD [11] | | |
| 12 | 34.6544 | 2.666 | 1.74950 | 35.28 |
| 13 | −217.1542 | 7.002 | | |
| 14 | 25.6579 | 0.725 | 1.48749 | 70.23 |
| 15 | 15.0992 | DD [15] | | |
| 16 (aperture stop) | ∞ | 7.614 | | |
| 17 | 111.3602 | 3.449 | 1.49700 | 81.54 |
| 18 | −24.7471 | DD [18] | | |
| 19 | −21.5612 | 0.532 | 1.72916 | 54.68 |
| 20 | 27.6715 | 0.429 | | |
| 21 | 63.9589 | 3.097 | 1.48749 | 70.23 |
| 22 | −13.5757 | 0.290 | | |
| 23 | −11.9088 | 0.633 | 1.78800 | 47.37 |
| 24 | 50.0219 | 3.319 | 1.53715 | 74.81 |
| 25 | −19.6002 | 0.484 | | |
| 26 | 121.8129 | 4.030 | 1.53715 | 74.81 |
| 27 | −17.3652 | DD [27] | | |
| 28 | 39.9649 | 2.651 | 1.49700 | 81.54 |
| 29 | −64.6217 | 8.716 | | |
| 30 | ∞ | 33.841 | 1.51633 | 64.14 |
| 31 | ∞ | 1.450 | 1.50847 | 61.19 |
| 32 | ∞ | | | |

TABLE 8

Example 4: Data Related to Zoom

| | Wide Angle | Intermediate | Telephoto |
|---|---|---|---|
| Zoom Ratio | 1.00 | 1.32 | 1.58 |
| f | 10.00 | 13.20 | 15.80 |
| Bf | 0.01 | 0.01 | 0.01 |
| FNo. | 2.50 | 2.50 | 2.50 |
| 2ω (°) | 57.8 | 45.2 | 38.2 |
| DD [8] | 10.981 | 7.638 | 7.110 |
| DD [11] | 15.359 | 6.112 | 0.579 |
| DD [15] | 21.494 | 19.273 | 17.158 |
| DD [18] | 0.972 | 9.667 | 16.934 |
| DD [27] | 0.250 | 6.366 | 7.275 |
| Stop Diameter | 10.217 | 12.3132 | 13.7752 |

Meanwhile, A through L of FIG. 15 are diagrams that illustrate various aberrations of the projection zoom lens of Example 4.

Example 5

FIG. 5 illustrates the arrangements of lens groups of the projection zoom lens of Example 5 at the wide angle end, the telephoto end, and an intermediate position between the wide angle end and the telephoto end. In Example 5, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens L6, provided in this order from the magnification side.

A third lens group G3 is constituted by a single positive seventh lens L7. A fourth lens group G4 is constituted by an aperture stop St, which is a variable stop, and a negative eighth lens L8, provided in this order from the magnification side.

A fifth lens group G5 is constituted by five lenses, which are a negative ninth lens L9, a positive tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the fifth lens L5 and the sixth lens L6 are cemented together, and the twelfth lens L12 and the thirteenth lens L13 are cemented together as well.

Table 9 shows basic lens data of the projection zoom lens of Example 5. In addition, Table 10 shows data related to items at the wide angle end, the intermediate position, and the telephoto end as the projection zoom lens of Example 5 changes magnification, in the same manner as Table 2. The items and the manners in which they are shown are as described previously.

TABLE 9

Example 5: Basic Lens Data

| Si (Surface Number) | Ri (Radius of Curvature) | Di (Distance) | Ndj (Refractive Index) | vdj (Abbe's Number) |
|---|---|---|---|---|
| 1 | 48.1363 | 3.632 | 1.62299 | 58.16 |
| 2 | −1316.2876 | 0.614 | | |
| 3 | 33.0425 | 1.025 | 1.63854 | 55.38 |
| 4 | 15.6313 | 3.864 | | |
| 5 | 378.8269 | 0.885 | 1.72342 | 37.95 |
| 6 | 22.6357 | 3.917 | | |
| 7 | −25.7503 | 0.774 | 1.61800 | 63.33 |
| 8 | 25.7503 | DD [8] | | |
| 9 | 53.8423 | 0.924 | 1.74077 | 27.79 |
| 10 | 15.7094 | 8.168 | 1.73800 | 32.26 |
| 11 | −36.5776 | DD [11] | | |
| 12 | 43.9205 | 2.554 | 1.51823 | 58.90 |
| 13 | −72.8993 | DD [13] | | |
| 14 (aperture stop) | ∞ | 4.836 | | |
| 15 | −29.9496 | 0.580 | 1.77250 | 49.60 |
| 16 | −73.3444 | DD [16] | | |
| 17 | 228.2400 | 0.580 | 1.80610 | 33.27 |
| 18 | 16.9946 | 0.088 | | |
| 19 | 18.1462 | 5.615 | 1.49700 | 81.61 |
| 20 | −9.2265 | 0.064 | | |
| 21 | −9.0930 | 0.658 | 1.83481 | 42.73 |
| 22 | 51.9940 | 3.806 | 1.62004 | 36.26 |
| 23 | −21.5508 | 0.783 | | |
| 24 | ∞ | 4.178 | 1.49700 | 81.61 |
| 25 | −15.0657 | DD [25] | | |
| 26 | 38.3182 | 1.978 | 1.70154 | 41.24 |

TABLE 9-continued

Example 5: Basic Lens Data

| Si (Surface Number) | Ri (Radius of Curvature) | Di (Distance) | Ndj (Refractive Index) | vdj (Abbe's Number) |
|---|---|---|---|---|
| 27 | ∞ | 8.756 | | |
| 28 | ∞ | 33.853 | 1.51633 | 64.14 |
| 29 | ∞ | 1.451 | 1.50847 | 61.19 |
| 30 | ∞ | | | |

TABLE 10

Example 5: Data Related to Zoom

| | Wide Angle | Intermediate | Telephoto |
|---|---|---|---|
| Zoom Ratio | 1.00 | 1.32 | 1.58 |
| f' | 10.00 | 13.20 | 15.80 |
| Bf | 0.05 | 0.05 | 0.05 |
| FNo. | 2.50 | 2.50 | 2.50 |
| 2ω (°) | 57.6 | 45.2 | 38.2 |
| DD [8] | 6.511 | 5.643 | 5.833 |
| DD [11] | 31.331 | 17.426 | 4.533 |
| DD [13] | 9.979 | 19.688 | 21.827 |
| DD [16] | 8.827 | 4.475 | 5.615 |
| DD [25] | 0.231 | 9.645 | 19.071 |
| Stop Diameter | 10.1512 | 10.9926 | 11.6166 |

Meanwhile, A through L of FIG. 16 are diagrams that illustrate various aberrations of the projection zoom lens of Example 5.

Example 6

Figure 6:
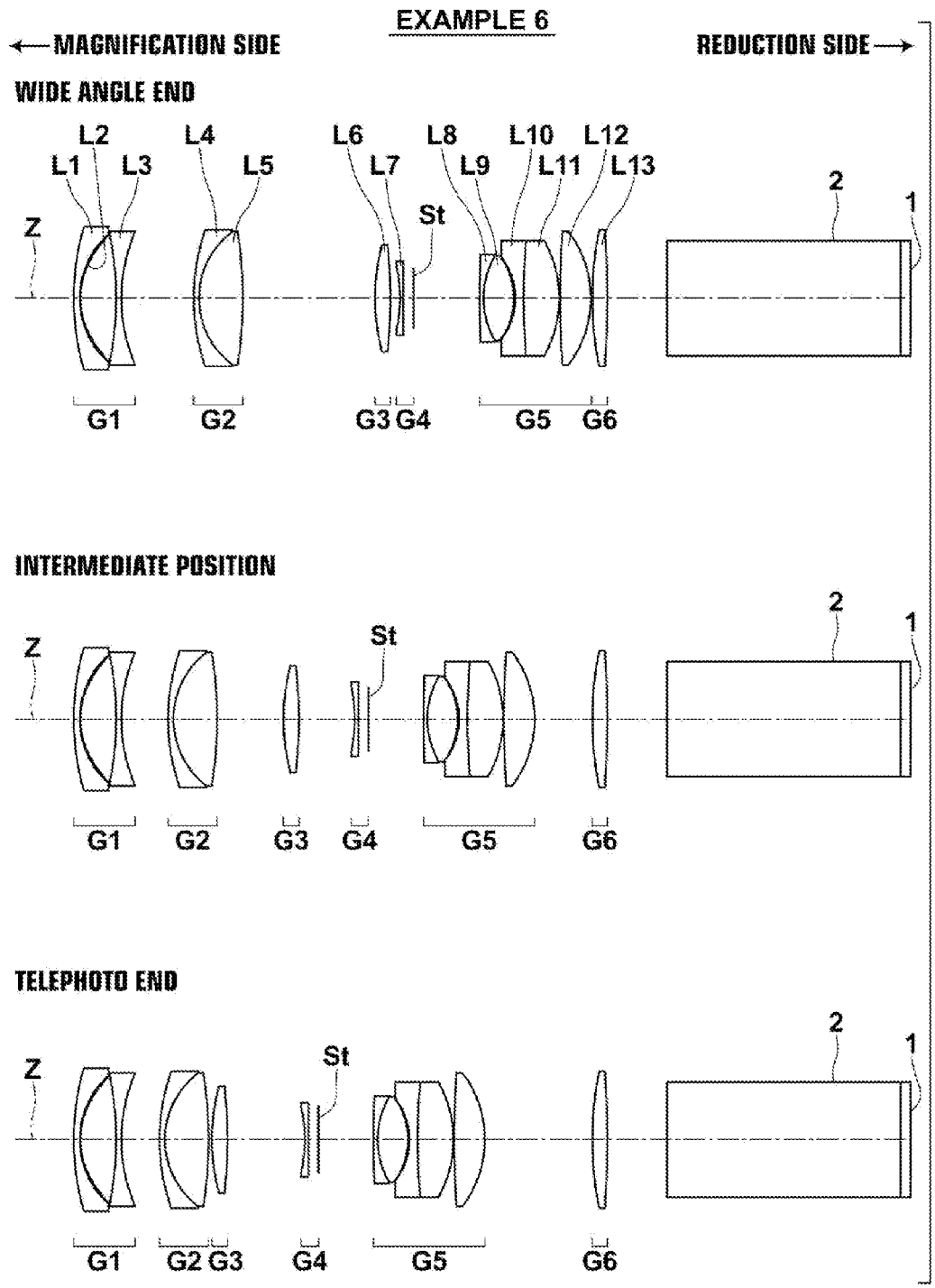
FIG. 6 is a collection of sectional diagrams that illustrate the lens configuration of a projection zoom lens according to Example 6 of the present invention.

FIG. 6 illustrates the arrangements of lens groups of the projection zoom lens of Example 6 at the wide angle end, the telephoto end, and an intermediate position between the wide angle end and the telephoto end. In Example 6, a first lens group G1 is constituted by three lenses, which are a negative first lens L1, a negative second lens L2, and a negative third lens L3, provided in this order from the magnification side. A second lens group G2 is constituted by a negative fourth lens L4 and a positive fifth lens L5, provided in this order from the magnification side.

A third lens group G3 is constituted by a single positive sixth lens L6. A fourth lens group G4 is constituted by a negative seventh lens L7 and an aperture stop St, which is a variable stop, provided in this order from the magnification side.

A fifth lens group G5 is constituted by five lenses, which are a negative eighth lens L8, a positive ninth lens L9, a negative tenth lens L10, a positive eleventh lens L11, and a positive twelfth lens L12, provided in this order from the magnification side. A sixth lens group G6 is constituted by a single positive thirteenth lens L13.

Note that the fourth lens L4 and the fifth lens L5 are cemented together, the eighth lens L8 and the ninth lens L9 are cemented together, and the tenth lens L10 and the eleventh lens L11 are cemented together as well. In addition, the second lens L2 is formed by a thin resin layer which is adhesively attached to the surface of the first lens L1 toward the reduction side, and forms a compound aspherical surface.

Table 11 shows basic lens data of the projection zoom lens of Example 6. In addition, Table 12 shows data related to items at the wide angle end, the intermediate position, and the telephoto end as the projection zoom lens of Example 6 changes magnification, in the same manner as Table 2. The items and the manners in which they are shown are as described previously.

In Example 6, the surface of the second lens L2 toward the reduction side (the surface having surface number 3) is an aspherical surface. Therefore, Table 13 shows data related to the aspherical surface. The aspherical surface data of Table 13 shows the surface number of aspherical surfaces and aspherical surface coefficients related to each aspherical surface. In the numerical values shown as the aspherical surface data in Table 13, the symbol "E-n" (n is an integer) indicates that the numerical value is to be multiplied by 10ⁿ. Note that the aspherical surface coefficients are the values of coefficients KA and Am (m=3, 4, 16) in the aspherical surface shape formula below.

$$Zd = C \cdot h^2 / \{1 + (1 - KA \cdot C^2 \cdot h^2)^{1/2}\} + \Sigma Am \cdot h^m$$

wherein: Zd is the depth of the aspherical surface (the length of a normal line that extends from a point on the aspherical surface having a height h to a plane perpendicular to the optical axis that contacts the apex of the aspherical surface), h is the height (the distance from the optical axis to the surface of the lens, C is the inverse of the paraxial radius of curvature, and KA and Am are aspherical surface coefficients (m=3, 4, 5, . . . , 16).

TABLE 11

Example 6: Basic Lens Data

| Si (Surface Number) | Ri (Radius of Curvature) | Di (Distance) | Ndj (Refractive Index) | νdj (Abbe's Number) |
|---|---|---|---|---|
| 1 | 38.8679 | 0.872 | 1.67003 | 47.23 |
| 2 | 12.8384 | 0.073 | 1.52771 | 41.86 |
| *3 | 11.2617 | 5.209 | | |
| 4 | -46.1298 | 0.751 | 1.49700 | 81.54 |
| 5 | 24.9090 | DD [5] | | |
| 6 | 30.7719 | 0.780 | 1.74077 | 27.79 |
| 7 | 12.3571 | 6.351 | 1.73800 | 32.26 |
| 8 | -62.9591 | DD [8] | | |
| 9 | 30.4509 | 2.257 | 1.51742 | 52.43 |
| 10 | -69.9484 | DD [10] | | |
| 11 | -22.3193 | 0.509 | 1.72916 | 54.68 |
| 12 | 4825.4325 | 1.453 | | |
| 13 (aperture stop) | ∞ | DD [13] | | |
| 14 | 156.9934 | 0.587 | 1.80400 | 46.58 |
| 15 | 12.6311 | 4.398 | 1.49700 | 81.54 |
| 16 | -10.8480 | 0.222 | | |
| 17 | -9.8962 | 1.217 | 1.80400 | 46.58 |
| 18 | 104.4568 | 5.189 | 1.49700 | 81.54 |
| 19 | -17.4220 | 0.096 | | |
| 20 | 138.5610 | 4.469 | 1.49700 | 81.54 |
| 21 | -16.4603 | DD [21] | | |
| 22 | 51.6540 | 2.155 | 1.67003 | 47.23 |
| 23 | -152.6019 | 8.770 | | |
| 24 | ∞ | 33.914 | 1.51633 | 64.14 |
| 25 | ∞ | 1.453 | 1.50847 | 61.19 |
| 26 | ∞ | | | |

*aspherical surface

TABLE 12

Example 6: Data Related to Zoom

| | Wide Angle | Intermediate | Telephoto |
|---|---|---|---|
| Zoom Ratio | 1.00 | 1.32 | 1.58 |
| f | 10.00 | 13.20 | 15.80 |
| Bf | 0.05 | 0.05 | 0.05 |
| FNo. | 2.50 | 2.50 | 2.50 |
| 2ω (°) | 57.8 | 45.0 | 38.2 |

TABLE 12-continued

Example 6: Data Related to Zoom

| | Wide Angle | Intermediate | Telephoto |
|---|---|---|---|
| DD [5] | 10.522 | 6.788 | 5.561 |
| DD [8] | 19.225 | 9.646 | 0.483 |
| DD [10] | 1.370 | 8.118 | 11.244 |
| DD [13] | 9.613 | 8.009 | 8.039 |
| DD [21] | 0.228 | 8.397 | 15.631 |
| Stop Diameter | 8.6432 | 9.3216 | 9.806 |

TABLE 13

Example 6: Aspherical Surface Data

| | Surface Number 3 |
|---|---|
| KA | 1.0000000E+00 |
| A3 | 6.7776168E-06 |
| A4 | -5.7833183E-05 |
| A5 | -4.9497647E-06 |
| A6 | 2.0585791E-06 |
| A7 | -2.1978980E-07 |
| A8 | -1.3484847E-07 |
| A9 | 4.9158816E-08 |
| A10 | -7.3692226E-09 |
| A11 | 6.1627499E-10 |
| A12 | -4.8390077E-11 |
| A13 | 5.2879972E-12 |
| A14 | -3.9439680E-13 |
| A15 | 1.1068858E-14 |
| A16 | 2.1443745E-17 |

Meanwhile, A through L of FIG. 17 are diagrams that illustrate various aberrations of the projection zoom lens of Example 6.

Example 7

FIG. 7 illustrates the arrangements of lens groups of the projection zoom lens of Example 7 at the wide angle end, the telephoto end, and an intermediate position between the wide angle end and the telephoto end. In the projection zoom lens of Example 7, a first lens group G1 is constituted by three lenses, which are a positive first lens L1, a negative second lens L2, and a negative third lens L3, provided in this order from the magnification side. A second lens group G2 is constituted by a negative fourth lens L4 and a positive fifth lens L5, provided in this order from the magnification side.

A third lens group G3 is constituted by a positive sixth lens L6 and a negative seventh lens L7, provided in this order from the magnification side. A fourth lens group G4 is constituted by a single positive eighth lens L8.

A fifth lens group G5 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the fourth lens L4 and the fifth lens L5 are cemented together, and the eleventh lens L11 and the twelfth lens L12 are cemented together as well.

Table 14 shows basic lens data of the projection zoom lens of Example 7. In addition, Table 15 shows data related to items at the wide angle end, the intermediate position, and the telephoto end as the projection zoom lens of Example 7 changes magnification, in the same manner as Table 2.

TABLE 14

Example 7: Basic Lens Data

| Si (Surface Number) | Ri (Radius of Curvature) | Di (Distance) | Ndj (Refractive Index) | vdj (Abbe's Number) |
|---|---|---|---|---|
| 1 | 57.1672 | 2.570 | 1.63854 | 55.38 |
| 2 | −119.3632 | 1.522 | | |
| 3 | 28.2685 | 1.054 | 1.77250 | 49.60 |
| 4 | 13.3522 | 3.773 | | |
| 5 | −22.6907 | 0.851 | 1.80518 | 25.42 |
| 6 | 30.2483 | DD [6] | | |
| 7 | −16.7245 | 0.871 | 1.63854 | 55.38 |
| 8 | −72.0209 | 2.441 | 1.73800 | 32.26 |
| 9 | −16.5806 | DD [9] | | |
| 10 | 40.8653 | 2.529 | 1.72047 | 34.71 |
| 11 | −40.8653 | 0.130 | | |
| 12 | −35.7758 | 0.758 | 1.62004 | 36.26 |
| 13 | −100.5522 | DD [13] | | |
| 14 | 33.8872 | 2.758 | 1.49700 | 81.54 |
| 15 | −50.9500 | DD [15] | | |
| 16 (aperture stop) | ∞ | 1.986 | | |
| 17 | −20.9424 | 1.162 | 1.51742 | 52.43 |
| 18 | 16.4127 | 0.583 | | |
| 19 | 56.7932 | 3.028 | 1.48749 | 70.23 |
| 20 | −8.2620 | 0.021 | | |
| 21 | −8.1912 | 1.196 | 1.78800 | 47.37 |
| 22 | 43.9783 | 3.875 | 1.49700 | 81.54 |
| 23 | −17.3897 | 0.081 | | |
| 24 | 77.6965 | 4.212 | 1.49700 | 81.54 |
| 25 | −15.0184 | DD [25] | | |
| 26 | 43.2833 | 1.986 | 1.49700 | 81.54 |
| 27 | −57.6954 | 7.164 | | |
| 28 | ∞ | 27.804 | 1.51633 | 64.14 |
| 29 | ∞ | 1.192 | 1.50847 | 61.19 |
| 30 | ∞ | | | |

TABLE 15

Example 7: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.29 | 26.29 | 26.29 |
| FNo. | 2.50 | 2.50 | 2.50 |
| 2ω (°) | 48.6 | 38.2 | 30.0 |
| DD [6] | 5.724 | 5.401 | 4.531 |
| DD [9] | 12.639 | 4.689 | 1.585 |
| DD [13] | 30.119 | 26.939 | 19.126 |
| DD [15] | 0.794 | 8.305 | 15.670 |
| DD [25] | 0.475 | 4.417 | 8.839 |
| Stop Diameter | 8.768 | 9.180 | 9.644 |

Meanwhile, A through L of FIG. 18 are diagrams that illustrate various aberrations of the projection zoom lens of Example 7.

Example 8

Figure 8:
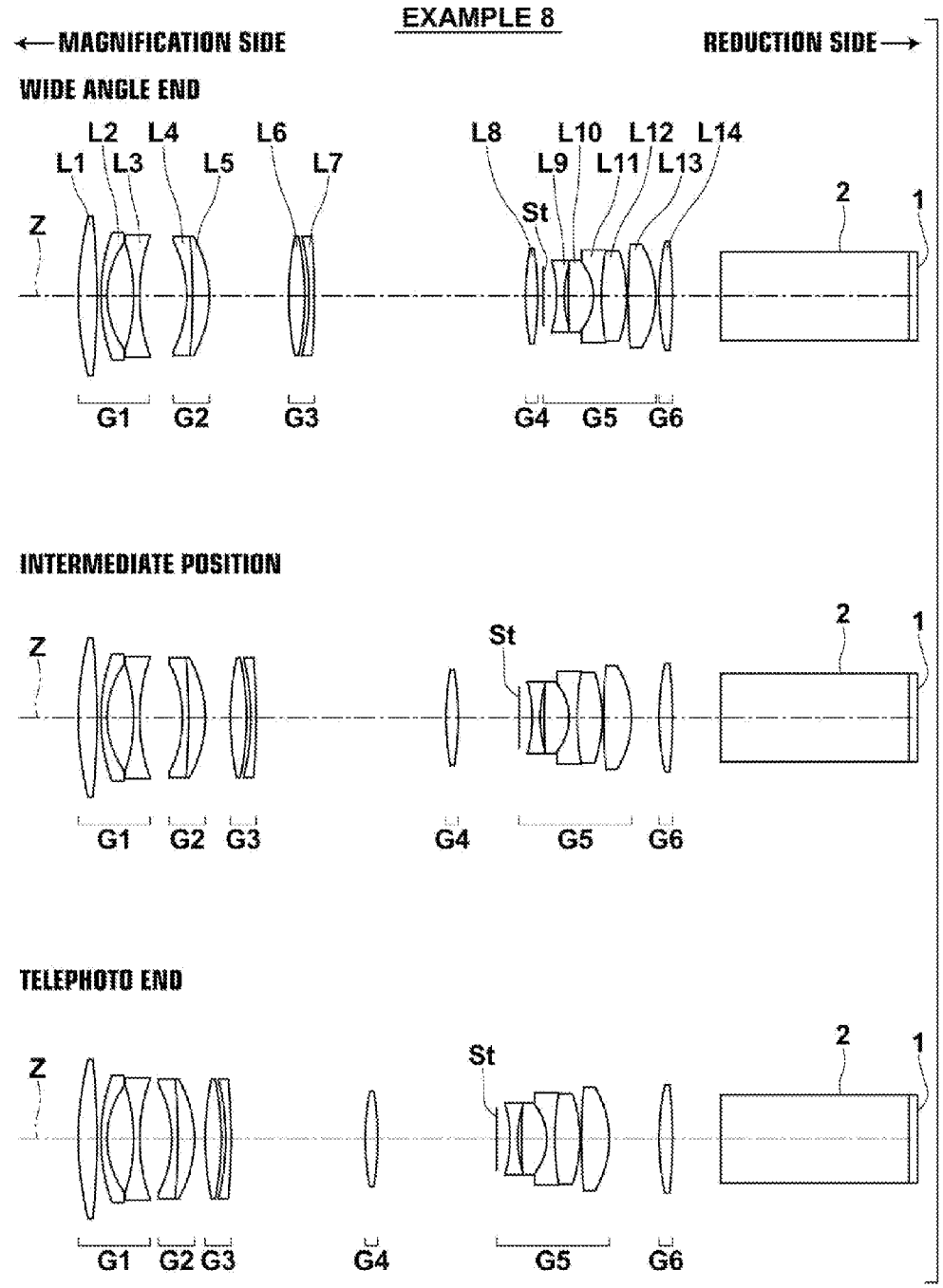
FIG. 8 is a collection of sectional diagrams that illustrate the lens configuration of a projection zoom lens according to Example 8 of the present invention.

FIG. 8 illustrates the arrangements of lens groups of the projection zoom lens of Example 8 at the wide angle end, the telephoto end, and an intermediate position between the wide angle end and the telephoto end. In Example 8, a first lens group G1 is constituted by three lenses, which are a positive first lens L1, a negative second lens L2, and a negative third lens L3, provided in this order from the magnification side. A second lens group G2 is constituted by a negative fourth lens L4 and a positive fifth lens L5, provided in this order from the magnification side.

A third lens group G3 is constituted by a positive sixth lens L6 and a negative seventh lens L7, provided in this order from the magnification side. A fourth lens group G4 is constituted by a single positive eighth lens L8.

A fifth lens group G5 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the fourth lens L4 and the fifth lens L5 are cemented together and the eleventh lens L11 and the twelfth lens L12 are cemented together as well.

Table 16 shows basic lens data of the projection zoom lens of Example 8. In addition, Table 17 shows data related to items at the wide angle end, the intermediate position, and the telephoto end as the projection zoom lens of Example 8 changes magnification, in the same manner as Table 2.

TABLE 16

Example 8: Basic Lens Data

| Si (Surface Number) | Ri (Radius of Curvature) | Di (Distance) | Ndj (Refractive Index) | vdj (Abbe's Number) |
|---|---|---|---|---|
| 1 | 49.0359 | 2.779 | 1.63854 | 55.38 |
| 2 | −115.0091 | 0.582 | | |
| 3 | 29.1697 | 0.884 | 1.71299 | 53.87 |
| 4 | 13.8954 | 3.946 | | |
| 5 | −25.7555 | 0.851 | 1.80518 | 25.42 |
| 6 | 26.7993 | DD [6] | | |
| 7 | −17.9988 | 0.897 | 1.62299 | 58.16 |
| 8 | −98.3079 | 2.461 | 1.73800 | 32.26 |
| 9 | −18.2535 | DD [9] | | |
| 10 | 44.0536 | 2.374 | 1.72047 | 34.71 |
| 11 | −44.0536 | 0.643 | | |
| 12 | −37.9866 | 0.788 | 1.60342 | 38.03 |
| 13 | −101.6000 | DD [13] | | |
| 14 | 40.6142 | 1.795 | 1.49700 | 81.54 |
| 15 | −44.7319 | DD [15] | | |
| 16 (aperture stop) | ∞ | 1.986 | | |
| 17 | −19.8048 | 1.144 | 1.51742 | 52.43 |
| 18 | 16.9153 | 0.589 | | |
| 19 | 90.5883 | 3.688 | 1.53715 | 74.81 |
| 20 | −8.1797 | 0.020 | | |
| 21 | −8.1196 | 1.195 | 1.78800 | 47.37 |
| 22 | 40.3923 | 3.698 | 1.53715 | 74.81 |
| 23 | −20.8848 | 0.207 | | |
| 24 | 96.4056 | 4.111 | 1.53715 | 74.81 |
| 25 | −15.2648 | DD [25] | | |
| 26 | 37.1467 | 1.986 | 1.49700 | 81.54 |
| 27 | −71.0526 | 7.159 | | |
| 28 | ∞ | 27.802 | 1.51633 | 64.14 |
| 29 | ∞ | 1.192 | 1.50847 | 61.19 |
| 30 | ∞ | | | |

TABLE 17

Example 8: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.28 | 26.28 | 26.28 |
| FNo. | 2.50 | 2.50 | 2.50 |
| 2ω (°) | 48.6 | 38.2 | 30.0 |
| DD [6] | 6.950 | 6.347 | 4.749 |
| DD [9] | 11.715 | 3.713 | 1.588 |
| DD [13] | 31.178 | 28.028 | 19.856 |
| DD [15] | 0.794 | 8.957 | 17.554 |
| DD [25] | 0.475 | 4.067 | 7.365 |
| Stop Diameter | 8.614 | 8.976 | 9.308 |

Meanwhile, A through L of FIG. 19 are diagrams that illustrate various aberrations of the projection zoom lens of Example 8.

Example 9

Figure 9:
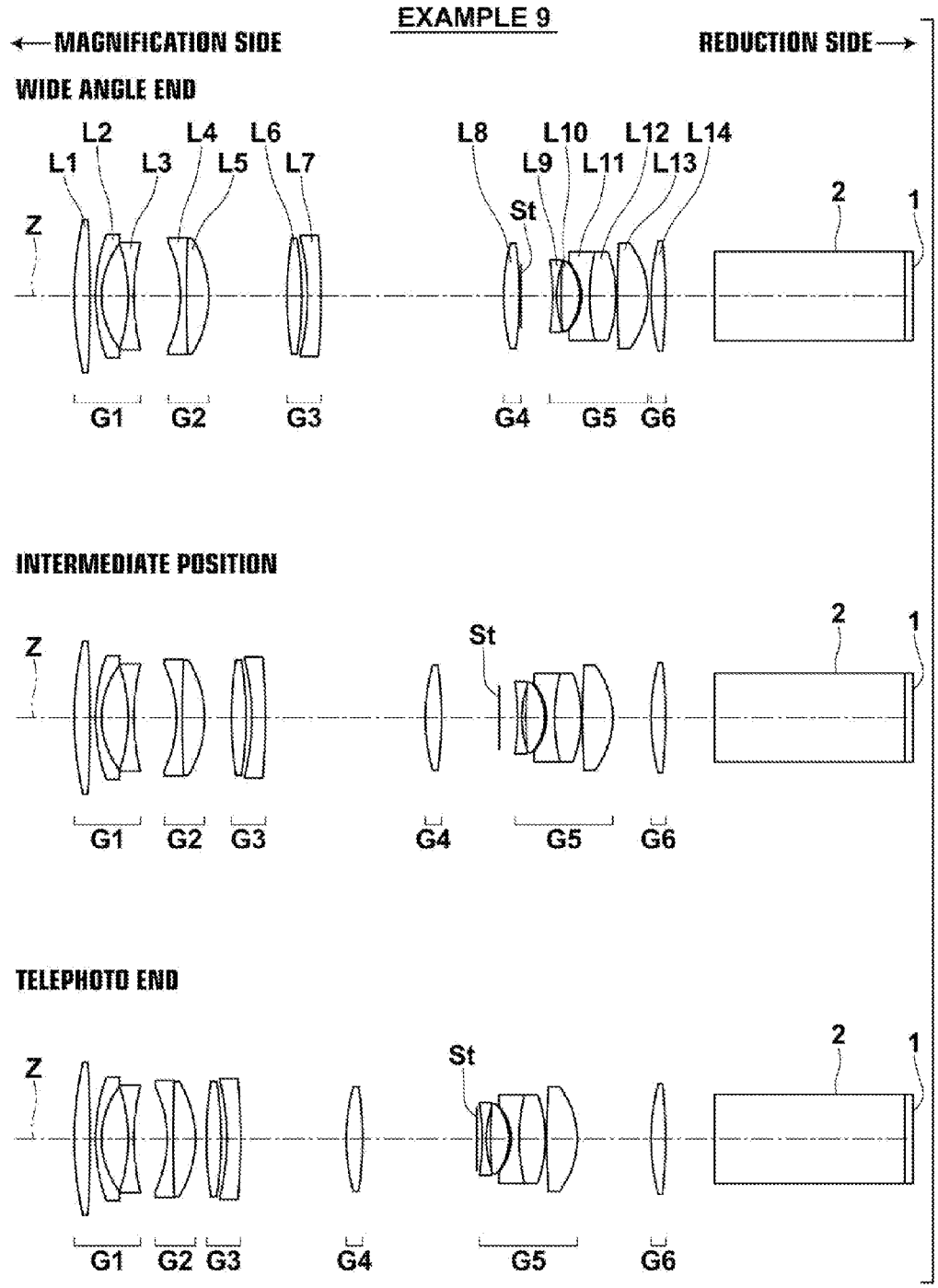
FIG. 9 is a collection of sectional diagrams that illustrate the lens configuration of a projection zoom lens according to Example 9 of the present invention.

FIG. 9 illustrates the arrangements of lens groups of the projection zoom lens of Example 9 at the wide angle end, the telephoto end, and an intermediate position between the wide angle end and the telephoto end.

In Example 9, a first lens group G1 is constituted by three lenses, which are a positive first lens L1, a negative second lens L2, and a negative third lens L3, provided in this order from the magnification side. A second lens group G2 is constituted by two lenses, which are a negative fourth lens L4 and a positive fifth lens L5, provided in this order from the magnification side.

A third lens group G3 is constituted by a positive sixth lens L6 and a negative seventh lens L7, provided in this order from the magnification side. A fourth lens group G4 is constituted by a single positive eighth lens L8.

An aperture stop St that moves along the optical axis Z independently of the fourth lens group G4 and a fifth lens group G5 to be described later is provided between the fourth lens group G4 and the fifth lens group G5. The aperture stop St is a movable aperture stop that moves as described above such that the numerical aperture of the zoom lens is constant through the entire zoom range.

Note that the aperture diameter of this aperture stop St is constant. However, the aperture stop St may be a variable stop that changes the aperture diameter thereof in order to maintain the numerical aperture of the zoom lens constant as described above. However, it is not necessary for the aperture stop to have both the functions of a moving stop and a variable stop in the present invention, and only one of the two functions may be imparted. Further, an aperture stop having neither of the two functions may be employed.

A fifth lens group G5 is constituted by five lenses, which are a negative ninth lens L9, a positive tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the fourth lens L4 and the fifth lens L5 are cemented together, and the eleventh lens L11 and the twelfth lens L12 are cemented together as well.

Table 18 shows basic lens data of the projection zoom lens of Example 9. In addition, Table 19 shows data related to items at the wide angle end, the intermediate position, and the telephoto end as the projection zoom lens of Example 9 changes magnification, in the same manner as Table 2.

TABLE 18

Example 9: Basic Lens Data

| Si (Surface Number) | Ri (Radius of Curvature) | Di (Distance) | Ndj (Refractive Index) | νdj (Abbe's Number) |
|---|---|---|---|---|
| 1 | 52.0248 | 2.292 | 1.77250 | 49.60 |
| 2 | −224.4960 | 0.810 | | |
| 3 | 27.1867 | 0.884 | 1.72916 | 54.68 |
| 4 | 12.9092 | 3.868 | | |
| 5 | −24.9555 | 0.851 | 1.84666 | 23.78 |
| 6 | 33.2739 | DD [6] | | |
| 7 | −18.0197 | 0.871 | 1.61800 | 63.33 |
| 8 | 198.0251 | 3.273 | 1.62004 | 36.26 |
| 9 | −16.3825 | DD [9] | | |
| 10 | 54.5372 | 2.145 | 1.83400 | 37.16 |
| 11 | −54.5372 | 0.858 | | |
| 12 | −35.5941 | 1.986 | 1.51633 | 64.14 |
| 13 | −98.9794 | DD [13] | | |
| 14 | 30.3174 | 2.340 | 1.49700 | 81.54 |

TABLE 18-continued

Example 9: Basic Lens Data

| Si (Surface Number) | Ri (Radius of Curvature) | Di (Distance) | Ndj (Refractive Index) | νdj (Abbe's Number) |
|---|---|---|---|---|
| 15 | −55.7848 | DD [15] | | |
| 16 (aperture stop) | ∞ | DD [16] | | |
| 17 | −34.6819 | 0.595 | 1.51742 | 52.43 |
| 18 | 14.9128 | 0.616 | | |
| 19 | 90.3520 | 2.725 | 1.48749 | 70.23 |
| 20 | −8.1243 | 0.277 | | |
| 21 | −7.6801 | 1.196 | 1.80400 | 46.57 |
| 22 | 28.1539 | 3.835 | 1.49700 | 81.54 |
| 23 | −19.0052 | 0.200 | | |
| 24 | 125.3300 | 4.457 | 1.49700 | 81.54 |
| 25 | −12.7151 | DD [25] | | |
| 26 | 31.7787 | 2.138 | 1.49700 | 81.54 |
| 27 | −70.6195 | 7.153 | | |
| 28 | ∞ | 27.804 | 1.51633 | 64.14 |
| 29 | ∞ | 1.192 | 1.50847 | 61.19 |
| 30 | ∞ | | | |

TABLE 19

Example 9: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.28 | 26.28 | 26.28 |
| FNo. | 2.50 | 2.50 | 2.50 |
| 2ω (°) | 48.6 | 38.2 | 30.0 |
| DD [6] | 6.805 | 6.204 | 4.861 |
| DD [9] | 11.435 | 3.896 | 1.589 |
| DD [13] | 26.664 | 23.393 | 15.479 |
| DD [15] | 0.194 | 8.423 | 16.730 |
| DD [16] | 4.642 | 2.717 | 0.780 |
| DD [25] | 0.472 | 5.579 | 10.774 |

Meanwhile, A through L of FIG. 20 are diagrams that illustrate various aberrations of the projection zoom lens of Example 9.

Example 10

FIG. 10 illustrates the arrangements of lens groups of the projection zoom lens of Example 10 at the wide angle end, the telephoto end, and an intermediate position between the wide angle end and the telephoto end.

In the projection zoom lens of Example 10, a first lens group G1 is constituted by five lenses, which are a positive first lens L1, a negative second lens L2, a negative third lens L3, a negative fourth lens L4, and a positive fifth lens L5, provided in this order from the magnification side. A second lens group G2 is constituted by two lenses, which are a positive sixth lens L6 and a negative seventh lens L7, provided in this order from the magnification side. A third lens group G3 is constituted by a single positive eighth lens L8.

A fourth lens group G4 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A fifth lens group G5 is constituted by a single positive fourteenth lens L14.

Note that the fourth lens L4 and the fifth lens L5 are cemented together, and the eleventh lens L11 and the twelfth lens L12 are cemented together as well.

Table 20 shows basic lens data of the projection zoom lens of Example 10. In addition, Table 21 shows data related to items at the wide angle end, the intermediate position, and the telephoto end as the projection zoom lens of Example 10 changes magnification, in the same manner as Table 2.

TABLE 20

Example 10: Basic Lens Data

| Si (Surface Number) | Ri (Radius of Curvature) | Di (Distance) | Ndj (Refractive Index) | vdj (Abbe's Number) |
|---|---|---|---|---|
| 1 | 48.5846 | 2.854 | 1.65844 | 50.88 |
| 2 | −107.8708 | 0.080 | | |
| 3 | 37.8639 | 1.588 | 1.63854 | 55.38 |
| 4 | 13.5679 | 4.139 | | |
| 5 | −22.8666 | 0.767 | 1.80518 | 25.42 |
| 6 | 28.5108 | 3.095 | | |
| 7 | −19.1843 | 1.195 | 1.62299 | 58.16 |
| 8 | 97.4610 | 3.170 | 1.73800 | 32.26 |
| 9 | −18.2143 | DD[9] | | |
| 10 | 31.0575 | 2.220 | 1.72047 | 34.71 |
| 11 | −82.1902 | 5.205 | | |
| 12 | −53.7384 | 0.710 | 1.62588 | 35.70 |
| 13 | 521.6010 | DD[13] | | |
| 14 | 26.9488 | 1.640 | 1.49700 | 81.54 |
| 15 | −66.8006 | DD[15] | | |
| 16 (aperture stop) | ∞ | 1.985 | | |
| 17 | −20.6337 | 1.191 | 1.51742 | 52.43 |
| 18 | 16.1202 | 0.578 | | |
| 19 | 63.9050 | 3.273 | 1.48749 | 70.24 |
| 20 | −8.0167 | 0.020 | | |
| 21 | −7.9511 | 1.195 | 1.77250 | 49.60 |
| 22 | 32.0361 | 3.187 | 1.49700 | 81.54 |
| 23 | −16.6166 | 1.182 | | |
| 24 | 86.6528 | 4.268 | 1.49700 | 81.54 |
| 25 | −14.4437 | DD[25] | | |
| 26 | 35.0914 | 1.985 | 1.49700 | 81.54 |
| 27 | −70.4236 | 7.152 | | |
| 28 | ∞ | 27.789 | 1.51633 | 64.14 |
| 29 | ∞ | 1.191 | 1.50847 | 61.19 |
| 30 | ∞ | | | |

TABLE 21

Example 10: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.27 | 26.27 | 26.27 |
| FNo. | 2.20 | 2.20 | 2.20 |
| 2ω (°) | 48.6 | 38.2 | 30.0 |
| DD[9] | 16.052 | 7.368 | 2.912 |
| DD[13] | 20.853 | 18.286 | 10.990 |
| DD[15] | 0.794 | 6.798 | 12.056 |
| DD[25] | 0.474 | 5.721 | 12.215 |
| Stop Diameter | 8.466 | 8.952 | 9.558 |

Meanwhile, A through L of FIG. 21 are diagrams that illustrate various aberrations of the projection zoom lens of Example 10.

Example 11

FIG. 11 illustrates the arrangements of lens groups of the projection zoom lens of Example 11 at the wide angle end, the telephoto end, and an intermediate position between the wide angle end and the telephoto end.

In the projection zoom lens of Example 11, a first lens group G1 is constituted by five lenses, which are a positive first lens L1, a negative second lens L2, a negative third lens L3, a negative fourth lens L4, and a positive fifth lens L5, provided in this order from the magnification side. A second lens group G2 is constituted by two lenses, which are a positive sixth lens L6 and a negative seventh lens L7, provided in this order from the magnification side. A third lens group G3 is constituted by a single positive eighth lens L8.

A fourth lens group G4 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A fifth lens group G5 is constituted by a single positive fourteenth lens L14.

Note that the fourth lens L4 and the fifth lens L5 are cemented together, and the eleventh lens L11 and the twelfth lens L12 are cemented together as well.

Table 22 shows basic lens data of the projection zoom lens of Example 11. In addition, Table 23 shows data related to items at the wide angle end, the intermediate position, and the telephoto end as the projection zoom lens of Example 11 changes magnification, in the same manner as Table 2.

TABLE 22

Example 11: Basic Lens Data

| Si (Surface Number) | Ri (Radius of Curvature) | Di (Distance) | Ndj (Refractive Index) | vdj (Abbe's Number) |
|---|---|---|---|---|
| 1 | 47.4582 | 2.729 | 1.77250 | 49.60 |
| 2 | −147.9167 | 0.317 | | |
| 3 | 36.5717 | 1.588 | 1.72916 | 54.68 |
| 4 | 14.3687 | 3.792 | | |
| 5 | −25.2759 | 0.767 | 1.80518 | 25.42 |
| 6 | 26.2960 | 4.634 | | |
| 7 | −19.9011 | 1.109 | 1.61800 | 63.33 |
| 8 | −28540.6466 | 2.552 | 1.69895 | 30.13 |
| 9 | −19.2799 | DD[9] | | |
| 10 | 36.0796 | 2.513 | 1.72047 | 34.71 |
| 11 | −37.6616 | 0.400 | | |
| 12 | −35.4435 | 0.710 | 1.85026 | 32.27 |
| 13 | −99.8243 | DD[13] | | |
| 14 | 27.0951 | 1.701 | 1.49700 | 81.54 |
| 15 | −65.9862 | DD[15] | | |
| 16 (aperture stop) | ∞ | 1.985 | | |
| 17 | −20.8458 | 1.191 | 1.51742 | 52.43 |
| 18 | 16.2859 | 0.617 | | |
| 19 | 125.0040 | 2.863 | 1.48749 | 70.24 |
| 20 | −8.0234 | 0.177 | | |
| 21 | −7.7914 | 1.195 | 1.78800 | 47.37 |
| 22 | 32.4539 | 3.924 | 1.49700 | 81.54 |
| 23 | −16.9401 | 0.390 | | |
| 24 | 119.5908 | 4.249 | 1.53715 | 74.81 |
| 25 | −14.1508 | DD[25] | | |
| 26 | 29.6587 | 2.084 | 1.43875 | 94.94 |
| 27 | −77.4035 | 7.156 | | |
| 28 | ∞ | 27.792 | 1.51633 | 64.14 |
| 29 | ∞ | 1.191 | 1.50847 | 61.19 |
| 30 | ∞ | | | |

TABLE 23

Example 11: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.27 | 26.27 | 26.27 |
| FNo. | 2.50 | 2.50 | 2.50 |
| 2ω (°) | 48.6 | 38.2 | 30.0 |
| DD[9] | 15.743 | 6.745 | 1.610 |

TABLE 23-continued

Example 11: Data Related to Zoom

|  | Wide Angle | Intermediate | Telephoto |
|---|---|---|---|
| DD[13] | 26.866 | 24.704 | 17.991 |
| DD[15] | 0.794 | 6.303 | 11.582 |
| DD[25] | 0.475 | 6.126 | 12.694 |
| Stop Diameter | 8.528 | 9.078 | 9.716 |

Meanwhile, A through L of FIG. 22 are diagrams that illustrate various aberrations of the projection zoom lens of Example 11.

TABLE 24

|  | Formula | Example 1 | Example 2 | Example 3 | Example 4 | Example 5 | Example 6 |
|---|---|---|---|---|---|---|---|
| (1) | (Rf2 − Rr2)/(Rf2 + Rr2) | 1.375 | 1.697 | 1.516 | 1.539 | 3.069 | 13.168 |
| (2) | (Rr2 − Rf3)/(Rr2 + Rf3) | 0.132 | 0.104 | 0.066 | 0.065 | 0.007 | 0.046 |
| (3) | Nd1 − Nd2 | 0.13023 | 0.27058 | 0.22687 | 0.24167 | 1.3091 | 1.3091 |
| (4) | Nd2 | 1.48749 | 1.51742 | 1.51633 | 1.48749 | 1.49700 | 1.49700 |
| (5) | Zr | 1.43 | 1.43 | 1.58 | 1.58 | 1.58 | 1.58 |
| (6) | f1/fw | −1.78 | −1.66 | −1.66 | −1.70 | −1.12 | −1.29 |
| (7) | fe/fw | 5.35 | 5.49 | 4.95 | 5.01 | 5.46 | 5.78 |
| (8) | f3/fw | 12.15 | 8.88 | 6.63 | 6.64 | 5.33 | 4.13 |
| (9) | Bf/Imφ | 2.94 | 2.94 | 2.94 | 2.94 | 2.94 | 2.94 |
| (10) | L/Imφ | 9.79 | 9.78 | 9.78 | 9.78 | 9.78 | 7.11 |

|  | Formula | Example 7 | Example 8 | Example 9 | Example 10 | Example 11 |
|---|---|---|---|---|---|---|
| (1) | (Rf2 − Rr2)/(Rf2 + Rr2) | 1.340 | 1.199 | 1.198 | 1.287 | 1.137 |
| (2) | (Rr2 − Rf3)/(Rr2 + Rf3) | 0.004 | 0.004 | 0.028 | 0.004 | 0.015 |
| (3) | Nd1 − Nd2 | 0.02993 | −0.01973 | 0.02993 | 0.02993 | 0.02993 |
| (4) | Nd2 | 1.48749 | 1.53715 | 1.48749 | 1.48749 | 1.48749 |
| (5) | Zr | 1.67 | 1.67 | 1.67 | 1.67 | 1.67 |
| (6) | f1/fw | −1.38 | −1.50 | −1.48 | −2.08 | −1.94 |
| (7) | fe/fw | 5.01 | 4.94 | 4.44 | 4.74 | 4.92 |
| (8) | f3/fw | 4.18 | 4.39 | 4.69 | 3.89 | 3.89 |
| (9) | Bf/Imφ | 2.94 | 2.94 | 2.94 | 2.94 | 2.94 |
| (10) | L/Imφ | 9.75 | 9.82 | 9.67 | 9.37 | 9.56 |

TABLE 25

| Condition | Example 1 | Example 2 | Example 3 | Example 4 | Example 5 | Example 6 |
|---|---|---|---|---|---|---|
| f1/fw | −1.78 | −1.66 | −1.66 | −1.70 | −1.12 | −1.29 |
| f2/fw | 8.54 | 9.45 | 11.00 | 12.35 | 3.09 | 2.90 |
| f4/fw | 4.36 | 4.89 | 4.05 | 4.11 | −6.59 | −3.05 |
| f5/fw | −97.22 | −470.96 | −44.76 | −58.41 | 5.65 | 4.36 |
| Nd1 | 1.61772 | 1.78800 | 1.74320 | 1.72916 | 1.80610 | 1.80400 |
| Rf2 | 103.87170 | 61.90350 | 65.39020 | 63.95890 | 18.14620 | 12.63110 |
| Rr2 | −16.39360 | −16.00450 | −13.41880 | −13.57570 | −9.22650 | −10.84800 |
| Rf3 | −12.57840 | −12.99400 | −11.76780 | −11.90880 | −9.09300 | −9.89620 |

| Condition | Example 7 | Example 8 | Example 9 | Example 10 | Example 11 |
|---|---|---|---|---|---|
| f1/fw | −1.38 | −1.5 | −1.48 | −2.08 | −1.94 |
| f2/fw | 12.05 | 13.43 | 14.53 | 4.68 | 4.22 |
| f4/fw | 4.14 | 4.31 | 3.99 | 15.8 | 18.99 |
| f5/fw | 17.37 | 14.45 | 61.16 | — | — |
| Nd1 | 1.51742 | 1.51742 | 1.51742 | 1.51742 | 1.51742 |
| Rf2 | 56.79320 | 90.58830 | 90.35200 | 63.90500 | 125.00400 |
| Rr2 | −8.26200 | −8.17970 | −8.12430 | −8.01670 | −8.02340 |
| Rf3 | −8.19120 | −8.11960 | −7.68010 | −7.95110 | −7.79140 |

Embodiments and Examples of the present invention have been described above. However, the projection zoom lens of the present invention is not limited to the Examples described above, and various modifications to the aspects of the projection zoom lens are possible. For example, the radii of curvature, the distances among surfaces, the refractive indices, and the Abbe's numbers of the lenses may be changed as appropriate.

In addition, the projection type display device of the present invention is not limited to that having the configuration described above, and various modifications to the aspects of the projection type display device are possible. For example, the light valves which are employed and the optical members which are employed to separate and combine light beams are not limited to those of the configuration described above.

What is claimed is:

1. A projection zoom lens, consisting of:
   a first lens group, which is provided most toward the magnification side, has a negative refractive power, and is fixed while changing magnification;

a final lens group, which is provided most toward the reduction side, has a positive refractive power, and is fixed while changing magnification; and an intermediate group provided between the first lens group and the final lens group, constituted by a plurality of moving lens groups that move independently of each other along the optical axis while changing magnification;

the moving lens group provided most toward the reduction side within the intermediate group comprising a lens having a negative refractive power, a lens having a positive refractive power, a lens having a negative refractive power, and a lens having a positive refractive power, provided in this order from the magnification side; and the projection zoom lens satisfying Conditional Formulae (1), (2), and (9) below:

$$1.00<(Rf2-Rr2)/(Rf2+Rr2) \tag{1}$$

$$0.00 \leq (Rr2-Rf3)/(Rr2+Rf3)<0.15 \tag{2}$$

$$2.5<Bf/Im\phi \tag{9}$$

wherein Rf2 is the radius of curvature of the front surface of the second lens from the magnification side within the lens group most toward the reduction side from among the lens groups that move while changing magnification, Rr2 is the radius of curvature of the rear surface of the second lens from the magnification side within the lens group most toward the reduction side from among the lens groups that move while changing magnification, Rf3 is the radius of curvature of the front surface of the third lens from the magnification side within the lens group most toward the reduction side from among the lens groups that move while changing magnification, Bf is the back focus of the entire system at the reduction side at the wide angle end as an air converted length, and Im$\phi$ is the maximum effective image circle diameter at the reduction side.

2. A projection zoom lens as defined in claim 1 that satisfies Conditional Formulae (3) and (4) below:

$$0<Nd1-Nd2 \tag{3}$$

$$Nd2<1.60 \tag{4}$$

wherein Nd1 is the refractive index with respect to the d line of the first lens from the magnification side within the lens group most toward the reduction side from among the lens groups that move while changing magnification, and Nd2 is the refractive index with respect to the d line of the second lens from the magnification side within the lens group most toward the reduction side from among the lens groups that move while changing magnification.

3. A projection zoom lens as defined in claim 2 that satisfies Conditional Formula (4') below:

$$Nd2<1.55 \tag{4'}$$

4. A projection zoom lens as defined in claim 1, wherein: the lens group provided most toward the reduction side within the intermediate group consists of a lens having a negative refractive power, a lens having a positive refractive power, a lens having a negative refractive power, a lens having a positive refractive power, and a lens having a positive refractive power, provided in this order from the magnification side.

5. A projection zoom lens as defined in claim 1, wherein: only spherical lenses are employed as lenses.

6. A projection zoom lens as defined in claim 1 that satisfies Conditional Formula (5) below:

$$1.4<Zr \tag{5}$$

wherein Zr is the zoom ratio of the telephoto end with respect to the wide angle end.

7. A projection zoom lens as defined in claim 1 that satisfies Conditional Formula (6) below:

$$-2.0<f1/fw<-0.8 \tag{6}$$

wherein f1 is the focal length of the first lens group, and fw is the focal length of the entire system at the wide angle end.

8. A projection zoom lens as defined in claim 7 that satisfies Conditional Formula (6') below:

$$-1.8<f1/fw<-1.0 \tag{6'}$$

9. A projection zoom lens as defined in claim 1 that satisfies Conditional Formula (7) below:

$$2.0<fe/fw<7.0 \tag{7}$$

wherein fe is the focal length of the final lens group, and fw is the focal length of the entire system at the wide angle end.

10. A projection zoom lens as defined in claim 9 that satisfies Conditional Formula (7') below:

$$3.0<fe/fw<6.0 \tag{7'}$$

11. A projection zoom lens as defined in claim 1, wherein: the intermediate group comprises at least a second lens group having a positive refractive power that moves while changing magnification and a third lens group having a positive refractive power that moves while changing magnification, provided in this order from the magnification side, and the projection zoom lens satisfies Conditional Formula (8) below:

$$3.0<f3/fw<8.0 \tag{8}$$

wherein f3 is the focal length of the third lens group, and fw is the focal length of the entire system at the wide angle end.

12. A projection zoom lens as defined in claim 1, wherein:
an aperture stop is provided between adjacent moving lens groups of the intermediate group or provided within one of the moving lens groups of the intermediate group;
the zoom lens is configured such that the numerical aperture of the zoom lens becomes constant through the entire zoom range; and
the projection zoom lens is configured such that the reduction side is telecentric.

13. A projection zoom lens as defined in claim 12, wherein:
the aperture stop is a variable stop that changes the aperture diameter thereof while changing magnification such that the numerical aperture of the zoom lens becomes constant through the entire zoom range.

14. A projection zoom lens as defined in claim 12, wherein:
the aperture stop is a movable stop that moves independently while changing magnification such that the numerical aperture of the zoom lens becomes constant through the entire zoom range.

15. A projection zoom lens as defined in claim 1 that satisfies Conditional Formula (10) below:

$$L/Im\phi<12 \tag{10}$$

wherein Imφ is the maximum effective image circle diameter at the reduction side, and L is the distance along the optical axis from the lens surface most toward the magnification side to the lens surface most toward the reduction side when the projection distance is infinity.

16. A projection zoom lens as defined in claim 1 that satisfies Conditional Formula (9') below:

$$2.8 < Nf/\text{Im}\phi \qquad (9').$$

17. A projection zoom lens as defined in claim 15 that satisfies Conditional Formula (10') below:

$$7 < L/\text{Im}\phi < 11 \qquad (10').$$

18. A projection type display device, comprising:
a light source;
a light valve, into which light from the light source enters; and
a projection zoom lens as defined in claim 1 that projects optical images formed by light modulated by the light valve onto a screen.

* * * * *